(12) United States Patent
Kawakubo et al.

(10) Patent No.: US 9,495,650 B2
(45) Date of Patent: Nov. 15, 2016

(54) INFORMATION DISPLAY SYSTEM, INFORMATION PROCESSING DEVICE, AND INFORMATION DISPLAY METHOD

(71) Applicants: Tomoko Kawakubo, Tokyo (JP); Yoshinori Fujita, Kanagawa (JP)

(72) Inventors: Tomoko Kawakubo, Tokyo (JP); Yoshinori Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 14/091,443

(22) Filed: Nov. 27, 2013

(65) Prior Publication Data
US 2014/0173491 A1 Jun. 19, 2014

(30) Foreign Application Priority Data

Dec. 14, 2012 (JP) ................................ 2012-273436

(51) Int. Cl.
| | |
|---|---|
| *G06F 3/0484* | (2013.01) |
| *G06Q 10/06* | (2012.01) |
| *G06Q 10/10* | (2012.01) |
| *H04L 12/18* | (2006.01) |

(52) U.S. Cl.
CPC .............. *G06Q 10/06* (2013.01); *G06Q 10/10* (2013.01); *H04L 12/1827* (2013.01)

(58) Field of Classification Search
CPC .................................................... G06F 3/0484
See application file for complete search history.

(56) References Cited

U.S. PATENT DOCUMENTS

| | | | |
|---|---|---|---|
| 6,834,371 B1* | 12/2004 | Jensen | G06F 17/30017 707/E17.009 |
| 7,698,645 B2* | 4/2010 | Fuse | G09B 5/067 715/730 |
| 2006/0159080 A1* | 7/2006 | Mazzaferri | 370/389 |
| 2007/0124682 A1 | 5/2007 | Fukeda et al. | |
| 2013/0024772 A1* | 1/2013 | Delia et al. | 715/730 |
| 2013/0100139 A1* | 4/2013 | Schliesser et al. | 345/467 |
| 2014/0344702 A1* | 11/2014 | Edge | G06Q 10/10 715/730 |

FOREIGN PATENT DOCUMENTS

| | | |
|---|---|---|
| JP | 2000-193765 | 7/2000 |
| JP | 2007-043493 | 2/2007 |
| JP | 2007-140721 | 6/2007 |
| JP | 2009-032240 | 2/2009 |
| JP | 2011-253225 | 12/2011 |
| JP | 2012-048628 | 3/2012 |
| JP | 2012-054710 | 3/2012 |

OTHER PUBLICATIONS

Japanese Office Action dated Aug. 30, 2016.

* cited by examiner

*Primary Examiner* — William Bashore
*Assistant Examiner* — Jeanette J Parker
(74) *Attorney, Agent, or Firm* — IPUSA, PLLC

(57) ABSTRACT

An information display system for displaying information according to an operation by a user, includes a progress management unit configured to compare a scheduled time of displaying the information with a time that the information is actually displayed, and determine a display progress of the information displayed by the operation of the user; and a display unit configured to display the display progress of the information, based on the display progress of the information determined by the progress management unit.

14 Claims, 27 Drawing Sheets

FIG.4

| EACH CONFERENCE | NUMBER OF MATERIALS |
|---|---|
| EACH MATERIAL | NUMBER OF PAGES |
| EACH PAGE | NUMBER OF CHARACTERS |
| | NUMBER OF WORDS |
| | NUMBER OF DIAGRAMS |
| | NUMBER OF SENTENCES |
| | READABILITY OF WRITING |
| | TECHNICALITY OF WRITING |
| | SPECIFICATION OF SPEED OF PRESENTER (SLOW, FAST, ETC.) |
| | RECORD OF PAST TIME AMOUNT |

FIG.7

| EACH CONFERENCE | NUMBER OF MATERIALS (d) |
|---|---|
| EACH MATERIAL | NUMBER OF PAGES (p) |
| EACH PAGE | NUMBER OF CHARACTERS (c) |
| | NUMBER OF WORDS (w) |
| | NUMBER OF DIAGRAMS (g) |
| | NUMBER OF SENTENCES (s) |
| | READABILITY OF WRITING ($\alpha$) |
| | TECHNICALITY OF WRITING ($\beta$) |
| | SPEED SPECIFICATION COEFFICIENT OF PRESENTER ($\gamma$) |
| | RECORD OF PAST TIME AMOUNT (tr) |

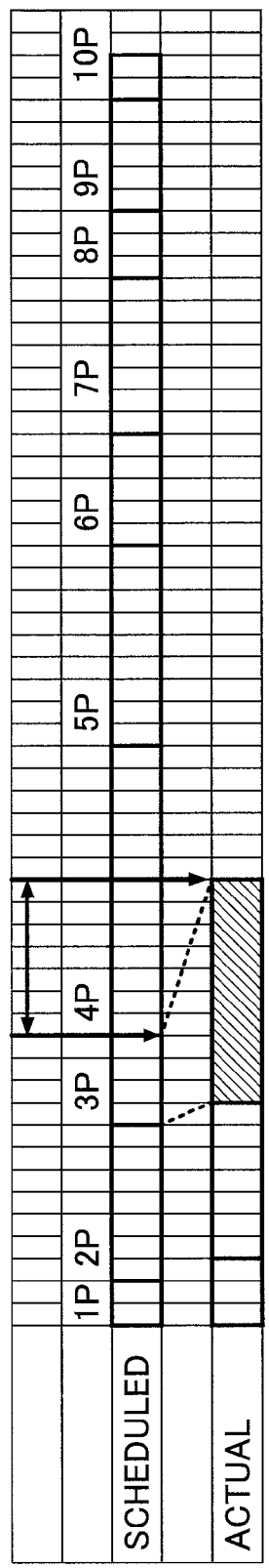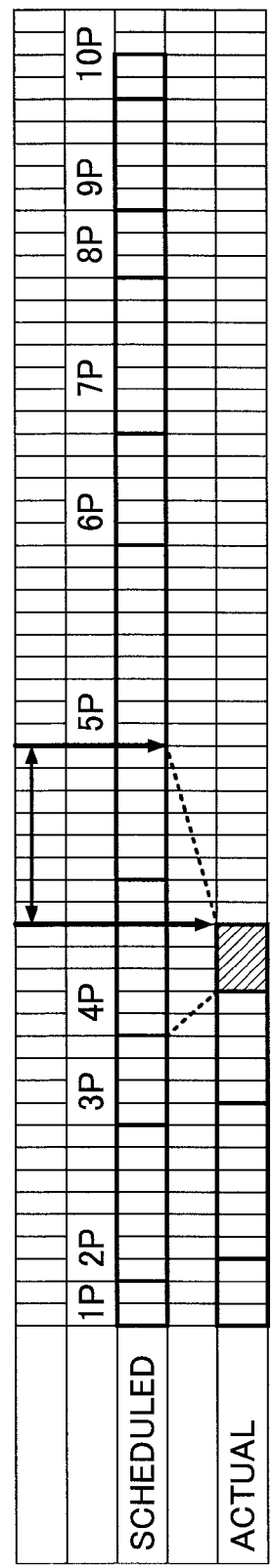

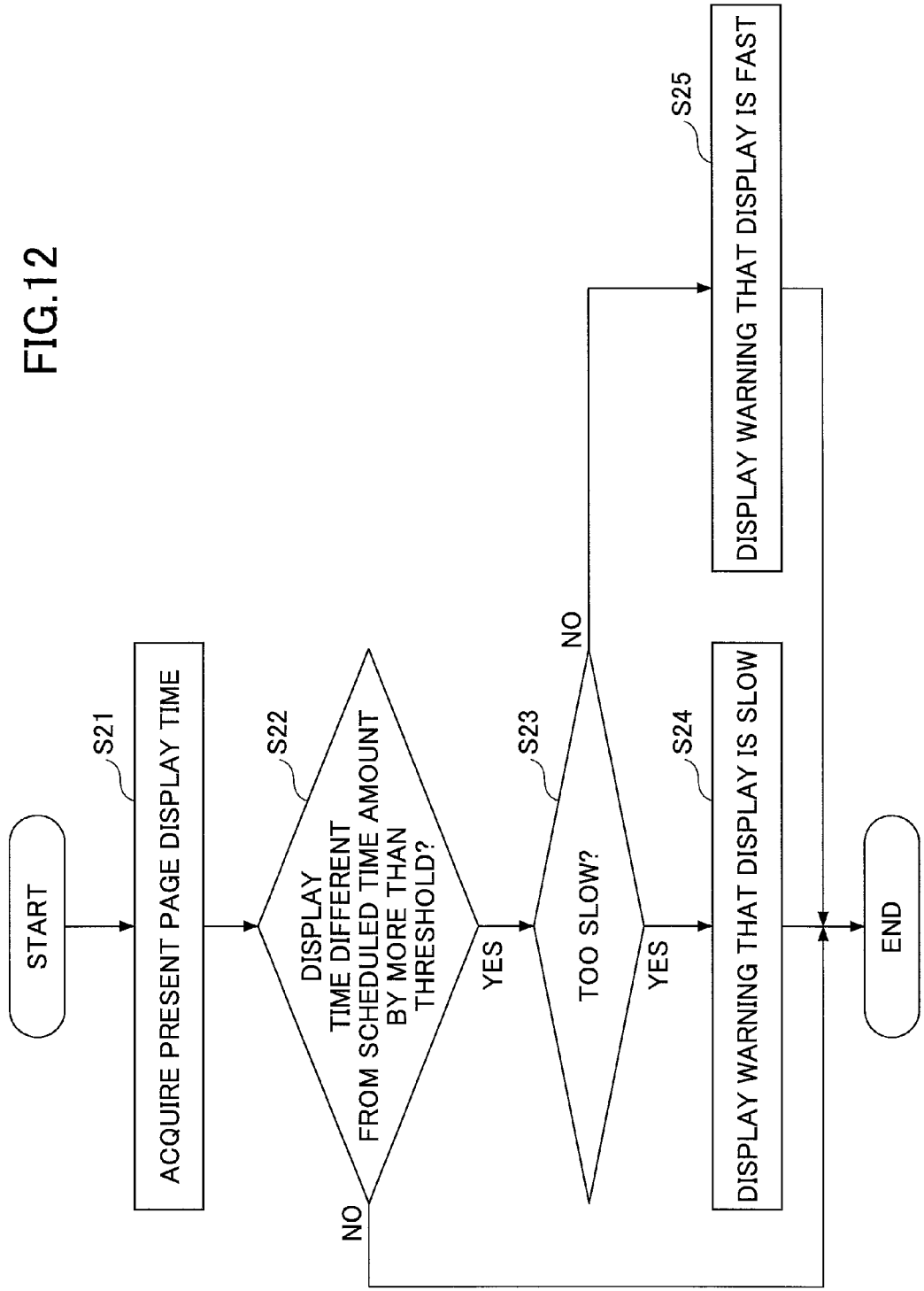

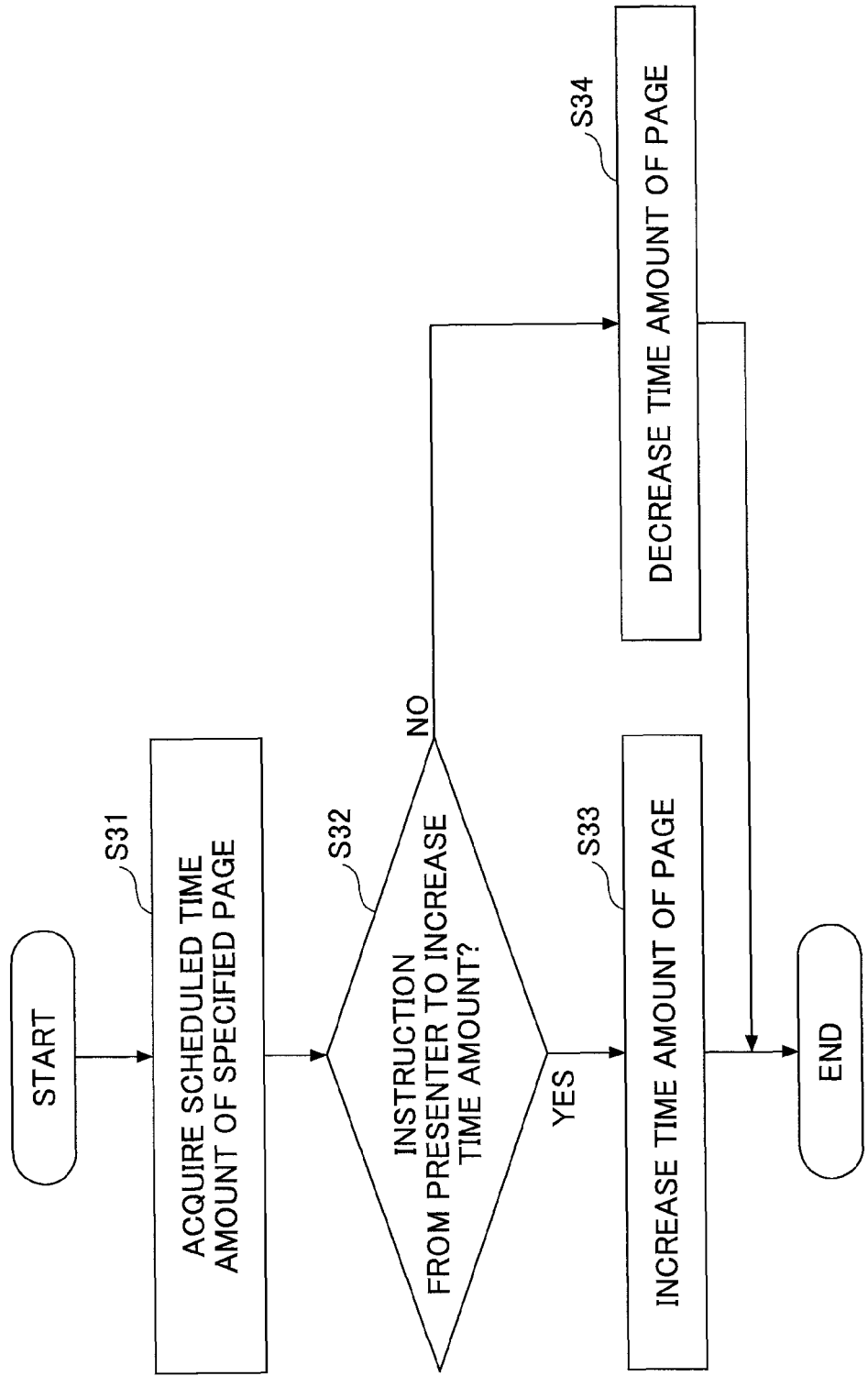

FIG.19A

PRESENT PAGE: 5P

PREDICTED END TIME 13:35

XXXXXXXXXXXXXXXXXXXXXXXXXX
XXXXXXXXXXXXXXXXX
XXXXXXXXXXXXXXXXXXXXXX
XXXXXXXXXXXX
XXXXXXXXXXXXXXXXXXXXXXX
XXXXXXXXXXX

| | 1P | 2P | 3P | 4P | 5P | 6P | 7P | 8P | 9P | 10P |
|---|---|---|---|---|---|---|---|---|---|---|
| SCHEDULED | | | | | | | | | | |
| ACTUAL | | | | | | | | | | |

EARLIER THAN SCHEDULED END TIME BY 20 MINUTES

THERE IS PAGE OF INSUFFICIENT EXPLANATION

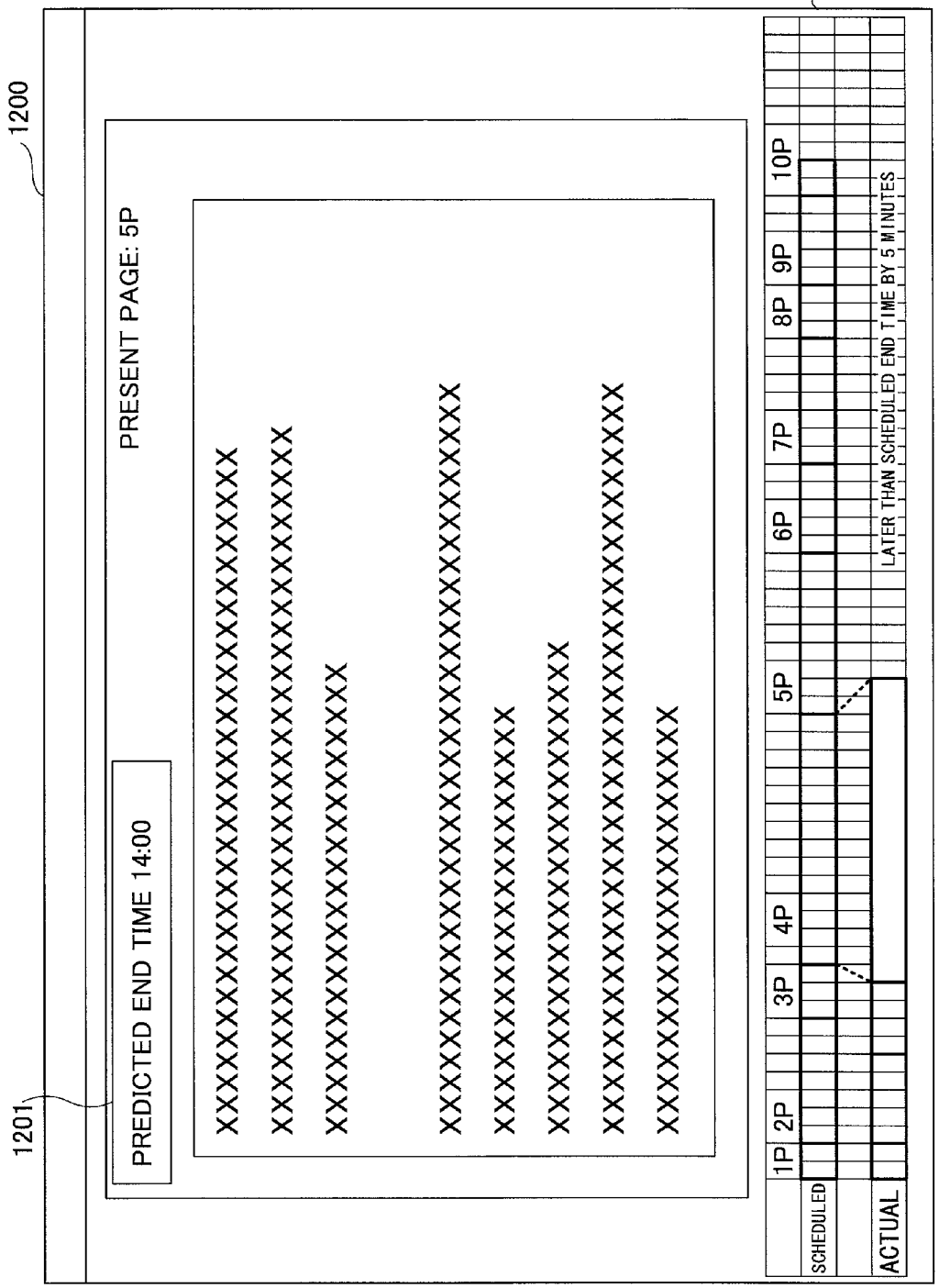

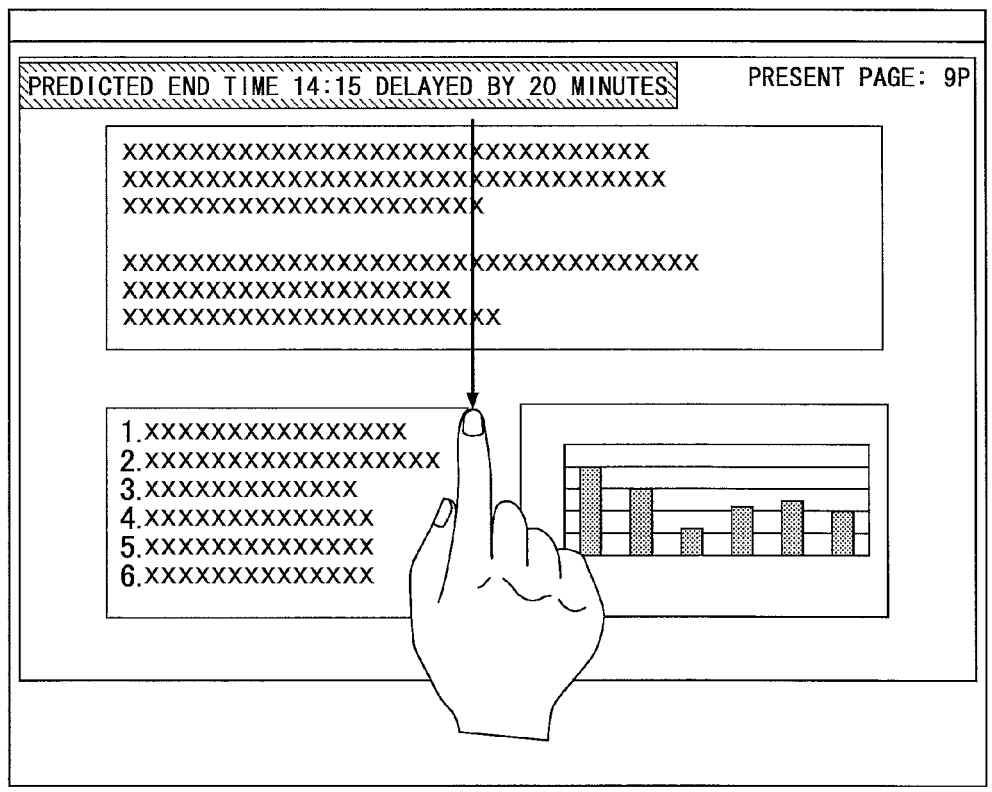
FIG.21
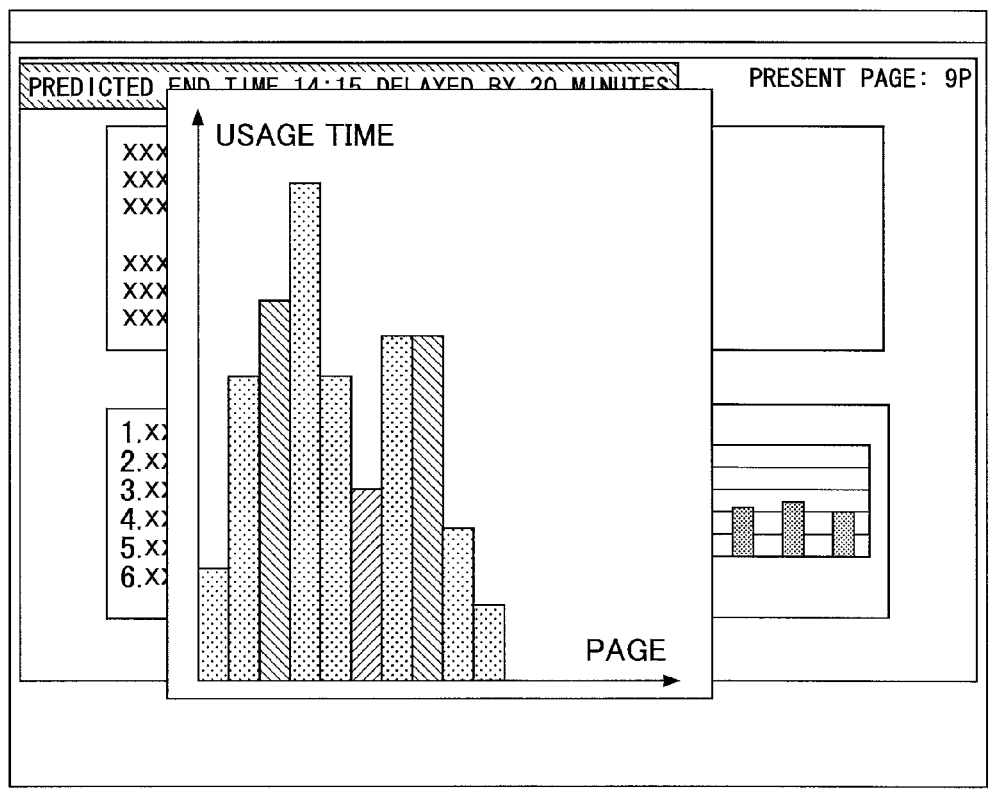

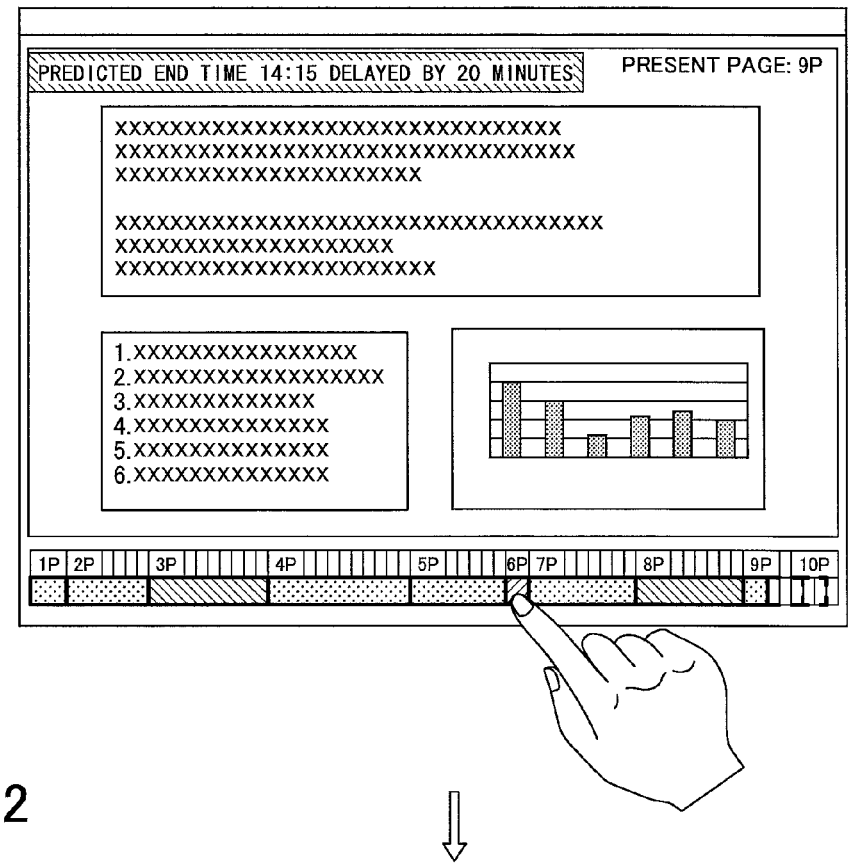
FIG.22
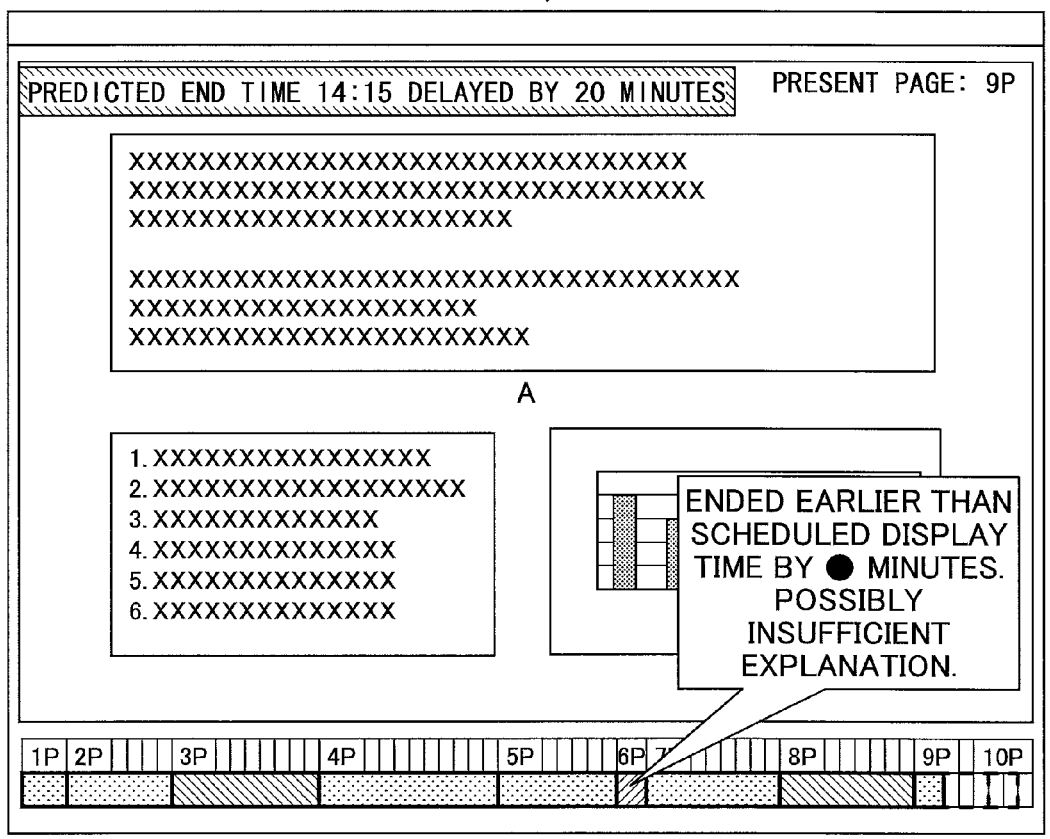

INFORMATION DISPLAY SYSTEM, INFORMATION PROCESSING DEVICE, AND INFORMATION DISPLAY METHOD

BACKGROUND OF THE INVENTION

1. Field of the Invention

The present invention relates to an information display system, an information processing device, and an information display method.

2. Description of the Related Art

In recent years, presentations often proceed by projecting, on a screen with a projector, still images or video images expressing contents of the presentation material, and having the presenter explain the images.

There is known a conventional presentation support system for precisely estimating the time required for the presentation or the question and answer session for the presentation (see, for example, Patent Document 1). The conventional presentation support system includes a explanation time predicting unit for predicting the time for explaining the presentation material, a question and answer session time predicting unit for predicting the question and answer session time, and an estimate result providing unit for presenting, to the presenter, the total time of the explanation time and the question and answer session time.

Patent Document 1: Japanese Laid-Open Patent Publication No. 2011-253225

SUMMARY OF THE INVENTION

The present invention provides an information display system, an information processing device, and an information display method, in which one or more of the above-described disadvantages are eliminated.

According to an aspect of the present invention, there is provided an information display system for displaying information according to an operation by a user, the information display system including a progress management unit configured to compare a scheduled time of displaying the information with a time that the information is actually displayed, and determine a display progress of the information displayed by the operation of the user; and a display unit configured to display the display progress of the information, based on the display progress of the information determined by the progress management unit.

According to an aspect of the present invention, there is provided an information display device for displaying information according to an operation by a user, the information display device including a progress management unit configured to compare a scheduled time of displaying the information with a time that the information is actually displayed, and determine a display progress of the information displayed by the operation of the user; and a display unit configured to display the display progress of the information, based on the display progress of the information determined by the progress management unit.

According to an aspect of the present invention, there is provided a non-transitory computer-readable recording medium storing a program for displaying information according to an operation by a user, wherein the program causes a computer to execute a process including comparing a scheduled time of displaying the information with a time that the information is actually displayed; determining a display progress of the information displayed by the operation of the user, based on a comparison result obtained at the comparing; and displaying the display progress of the information, based on the display progress of the information determined at the determining.

According to an aspect of the present invention, there is provided an information display method for displaying information according to an operation by a user, the information display method including comparing a scheduled time of displaying the information with a time that the information is actually displayed; determining a display progress of the information displayed by the operation of the user, based on a comparison result obtained at the comparing; and displaying the display progress of the information, based on the display progress of the information determined at the determining.

BRIEF DESCRIPTION OF THE DRAWINGS

Other objects, features and advantages of the present invention will become more apparent from the following detailed description when read in conjunction with the accompanying drawings, in which:

FIG. 4 is a configuration diagram of an example of parameters relevant to the time amount;

FIG. 7 is a configuration diagram of examples of parameters relevant to the time amount;

FIGS. 10A and 10B are image diagrams of examples of a progress warning display;

FIG. 12 is a flowchart of an example of a process of displaying the progress by each page;

FIG. 14 is a flowchart of an example of a process of updating the scheduled time amount of each page;

FIGS. 19A and 19B are image diagrams of another example of a screen displayed on the terminal device of the presenter during the conference;

FIG. 21 illustrates an example of an operation by the presenter for switching the screen;

FIG. 22 illustrates an example of an operation by the presenter for confirming a warning display;

DETAILED DESCRIPTION OF THE PREFERRED EMBODIMENTS

A description is given, with reference to the accompanying drawings, of embodiments of the present invention. In the following, an electronic conference system is described as an example of an information display system. The embodiment of the present invention is not limited to an electronic conference system; the embodiment of the present invention is applicable to an information display system by which the user has to determine the progress of the information display.

First Embodiment

System Configuration

Figure 1:
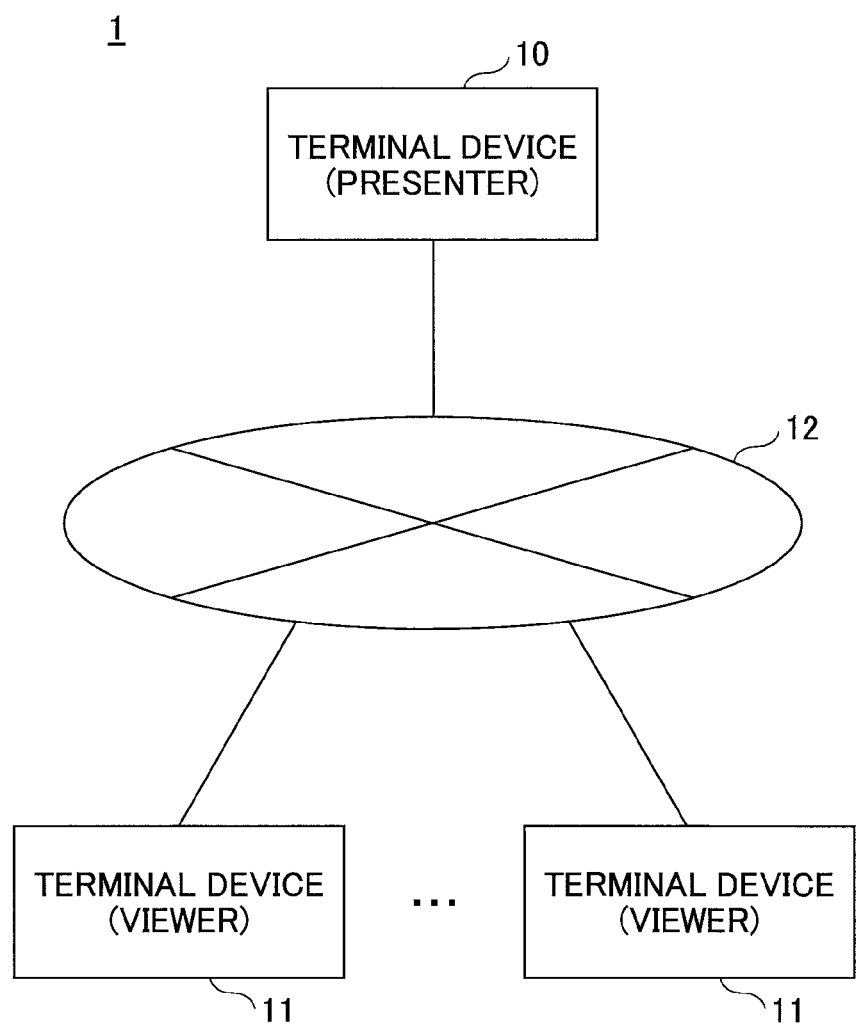
FIG. 1 illustrates an example of an electronic conference system according to a first embodiment.

FIG. 1 illustrates an example of an electronic conference system 1 according to a first embodiment. The example of the electronic conference system 1 of FIG. 1 includes a terminal device 10 of the presenter, and one or more terminal devices 11 of viewers, which are connected to a network 12 such as the Internet or LAN (Local Area Network).

The terminal device 10 is an information processing terminal operated by the presenter of the conference. The terminal device 11 is an information processing terminal operated by viewer (attendee other than presenter) of the conference. The terminal devices 10 and 11 are devices that can process information, such as a desktop personal computer, a notebook personal computer, a tablet PC, and a smartphone.

The terminal devices 10 and 11 display a conference material. The terminal device 10 receives actions from the presenter of the conference, such as turning a page, writing a memorandum, and tapping the screen. The terminal device 10 determines whether the action by the presenter of the conference is common information that is to be shared with the viewer of the conference. If the action is common information, the terminal device 10 sends the action as the common information to the terminal device 11 operated by the viewer of the conference. The terminal device 11 applies, to the conference material being displayed, the action by the presenter of the conference such as turning a page and writing a memorandum, based on the common information that has been received.

Hardware Configuration

Figure 2:
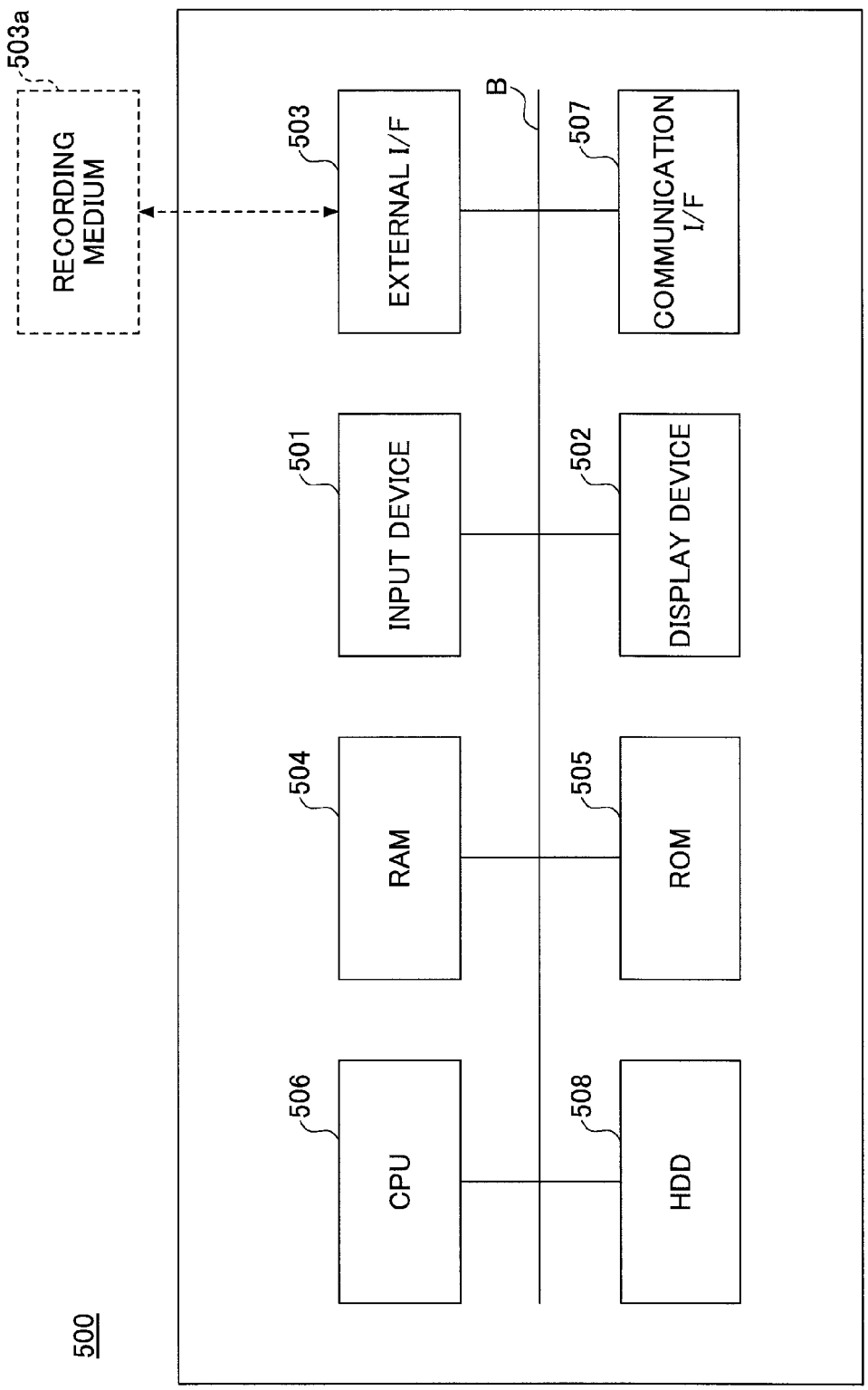
FIG. 2 is a hardware configuration diagram of an example of a computer system according to the first embodiment.

The terminal devices 10 and 11 are realized by, for example, a computer system 500 having a hardware configuration as illustrated in FIG. 2. FIG. 2 is a hardware configuration diagram of an example of the computer system 500 according to the present embodiment.

The computer system 500 illustrated in FIG. 2 includes an input device 501, a display device 502, an external I/F 503, a RAM (Random Access Memory) 504, a ROM (Read-Only Memory) 505, a CPU (Central Processing Unit) 506, a communication I/F 507, and a HDD (Hard Disk Drive) 508, which are interconnected by a bus B.

The input device 501 includes a keyboard, a mouse, and a touch panel, and is used for inputting various operation signals to the computer system 500. The display device 502 includes a display, and displays processing results obtained by the computer system 500.

The communication I/F 507 is an interface for connecting the computer system 500 to the network 12. Accordingly, the computer system 500 can perform data communication with another computer system 500 connected via the communication I/F 507.

The HDD 508 is a nonvolatile storage device storing programs and data. The programs and data that are stored include, for example, an OS (Operating System) that is the basic software for controlling the entire computer system 500, and application software for providing various functions in the OS. Furthermore, the HDD 508 manages the stored programs and data by a predetermined file system and/or a DB (database).

The external I/F 503 is an interface between the computer system 500 and an external device. An example of an external device is a recording medium 503a. Accordingly, the computer system 500 can read or write data in the recording medium 503a via the external I/F 503. Examples of the recording medium 503a are a flexible disk, a CD (Compact Disk), a DVD (Digital Versatile Disk), a SD memory card, and a USB memory (Universal Serial Bus memory).

The ROM 505 is a nonvolatile semiconductor memory (storage device) that can hold programs and data even after the power is turned off. The ROM 505 stores programs and data such as BIOS (Basic Input/Output System), which is executed when the computer system 500 is started up, OS settings, and network settings. The RAM 504 is a volatile semiconductor memory (storage device) for temporarily holding programs and data.

The CPU 506 is a processor for controlling the entire computer system 500 and realizing functions, by loading the programs and data from storage devices such as the ROM 505 and the HDD 508 into the RAM 504, and executing processes.

The terminal devices 10 and 11 execute programs in the computer system 500 having the hardware configuration as described above, for example, to realize various processes described below.

Software Configuration

Terminal Device 10 Operated by Presenter of Conference

Figure 3:
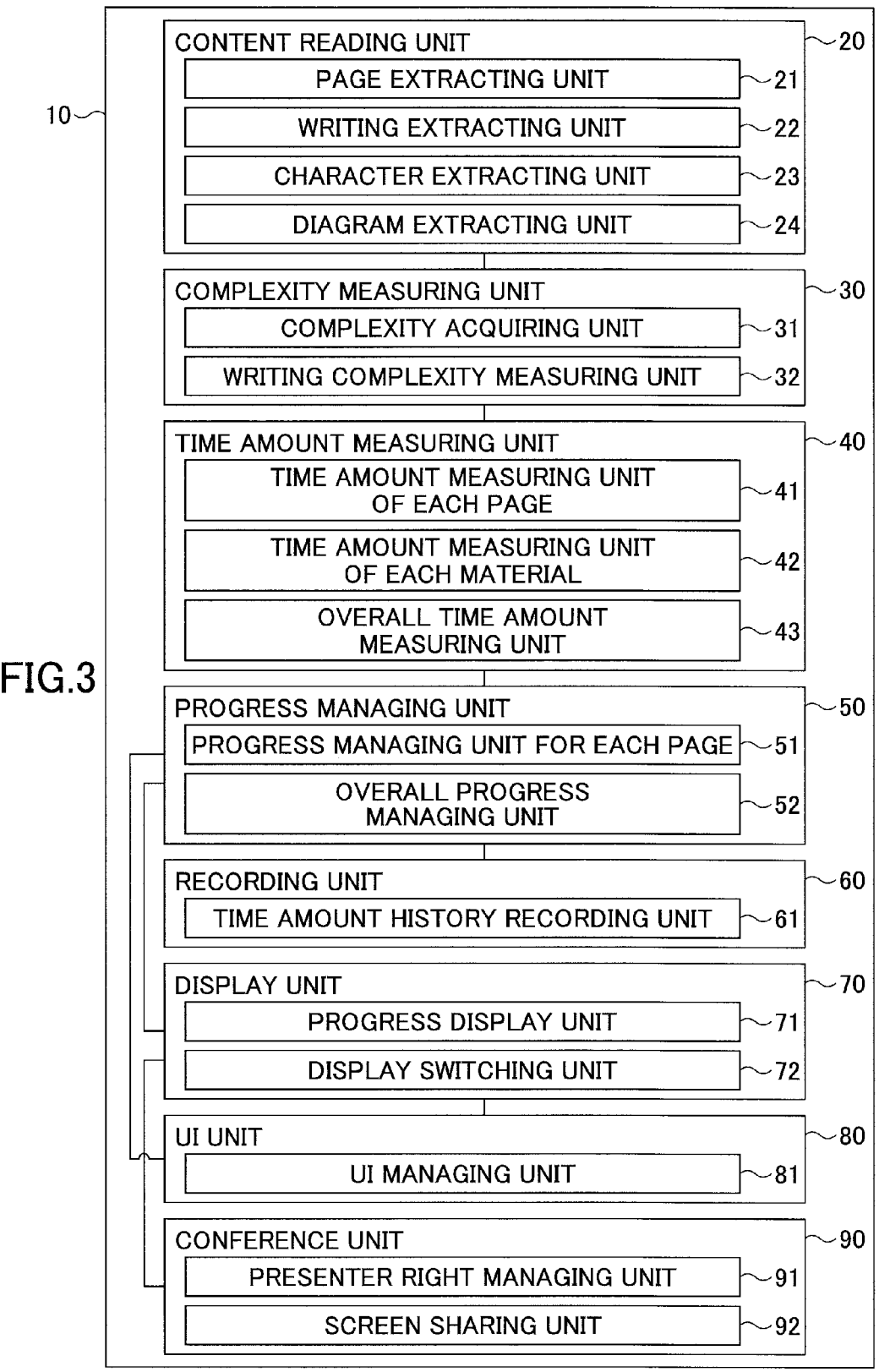
FIG. 3 is a process block diagram of an example of a terminal device operated by a presenter of a conference.

FIG. 3 is a process block diagram of an example of the terminal device 10 operated by a presenter of a conference. The terminal device 10 of FIG. 3 executes programs to implement a content reading unit 20, a complexity measuring unit 30, a time amount measuring unit 40, a progress managing unit 50, a recording unit 60, a display unit 70, a UI unit 80, and a conference unit 90.

The content reading unit 20 reads the content of each conference material. The content reading unit 20 includes a page extracting unit 21, a writing extracting unit 22, a character extracting unit 23, and a diagram extracting unit 24.

The page extracting unit 21 extracts the conference material by each page. Furthermore, the page extracting unit 21 acquires the number of pages of the conference material. The writing extracting unit 22 extracts a writing part of the content from each page. The character extracting unit 23 acquires, for each page, the number of characters, the number of words, and the number of sentences in the content, from the writing part of the content of each page extracted by the writing extracting unit 22.

The diagram extracting unit 24 extracts diagrams of the content from each page. The diagram extracting unit 24 extracts the number of diagrams extracted from each page. The diagram extracting unit 24 may extract the number of characters, the number of words, and the number of sentences in the content from the diagram part of the content of each page. Note that the processes of the writing extracting unit 22, the character extracting unit 23, and the diagram extracting unit 24 may be performed by using an external system.

The complexity measuring unit 30 measures the complexity of the content of each conference material read by the content reading unit 20, and creates parameters (complexity) relevant to the time amount illustrated in FIG. 4. A description of the parameters relevant to the time amount is given below with reference to FIG. 4. The complexity measuring unit 30 includes a complexity acquiring unit 31 and a writing complexity measuring unit 32.

The complexity acquiring unit 31 acquires, as parameters relevant to the time amount, the number of materials of each conference, the number of pages of a conference material, the number of characters, the number of words, the number of diagrams, and the number of sentences in each page, read by the content reading unit 20. Furthermore, the writing complexity measuring unit 32 measures the readability of the writing and the technicality of the writing, for each page. Note that the measurement of the readability of the writing may be performed by using an external system, such as a writing complexity (readability) measuring system. The measurement of the technicality of the writing may be performed by using an external system such as a technicality measuring system.

The time amount measuring unit 40 calculates the scheduled time amount of the conference from parameters relevant to the time amount created by the complexity measuring unit 30. The time amount measuring unit 40 includes a time amount measuring unit of each page 41, a time amount measuring unit of each material 42, and an overall time amount measuring unit 43.

The time amount measuring unit of each page 41 calculates the scheduled time amount of each page from the parameters relevant to the time amount. The time amount measuring unit of each material 42 calculates the scheduled time amount of each conference material from the total scheduled time amount of the pages. The overall time amount measuring unit 43 calculates the scheduled time amount of each conference from the total scheduled time amount of the conference materials.

The progress managing unit 50 compares the scheduled time amount with the present progress, and implements management. The progress managing unit 50 includes a progress managing unit for each page 51 and an overall progress managing unit 52. The progress managing unit for each page 51 compares the scheduled time amount of each page with the present progress. Furthermore, the progress managing unit for each page 51 changes the scheduled time amount of each page according to an instruction from the presenter. The overall progress managing unit 52 compares the scheduled time amount of each conference (overall scheduled time amount) with the present progress. Furthermore, the overall progress managing unit 52 changes the overall pace by increasing/decreasing the scheduled time amount of the remaining pages according to an instruction from the presenter. When the overall pace is changed according to the instruction from the presenter, the overall progress managing unit 52 updates the overall scheduled time amount (predicted end time).

A time amount history recording unit 61 of the recording unit 60 records, as the past time amounts, the time amount of each page, each conference material, and each conference, when a presentation has been made with a conference material. The past time amount is used as a parameter relevant to the time amount, and is used for calculating the scheduled time amount from next time onward.

The display unit 70 displays various information items such as the conference material and a warning. The display unit 70 includes a progress display unit 71 and a display switching unit 72. The progress display unit 71 displays the present progress and the scheduled time amount (predicted end time) calculated by the time amount measuring unit 40. Furthermore, the progress display unit 71 displays a warning in a case where there is a delay or a speed up exceeding a threshold, in a result obtained by comparing the scheduled time amount of each page, each conference material, or the overall conference, with the present progress. The display switching unit 72 switches the item to be displayed or switches between display/hide by a simple action of the presenter, so that the information can be displayed in the limited screen displaying the conference material. An example of the action of the presenter is tapping the screen, in the case of the terminal device 10 having a touch panel.

A UI managing unit 81 of the UI unit 80 manages the actions of the presenter. The UI managing unit 81 manages the progress when the presenter turns a page, instructs to switch the display when the presenter taps the screen, etc.

The conference unit 90 controls the progress of the overall conference. The conference unit 90 includes a presenter right managing unit 91 and a screen sharing unit 92. The presenter right managing unit 91 manages who is the presenter. The screen sharing unit 92 manages information relevant to sharing a screen, such as the page number of the page being displayed.

FIG. 4 is a configuration diagram of parameters relevant to the time amount. The parameters relevant to the time amount of FIG. 4 includes items such as the number of materials of each conference; the number of pages of each material; and the number characters, the number of words, the number of diagrams, the number of sentences, the readability of the writing, the technicality of the writing, a specification of the speed of the presenter, and a record of the past time amount, of each page. The parameters relevant to the time amount of FIG. 4 are used by the time amount measuring unit 40 for calculating the scheduled time amount of the page, the conference material, and the conference, etc.

Figure 5:
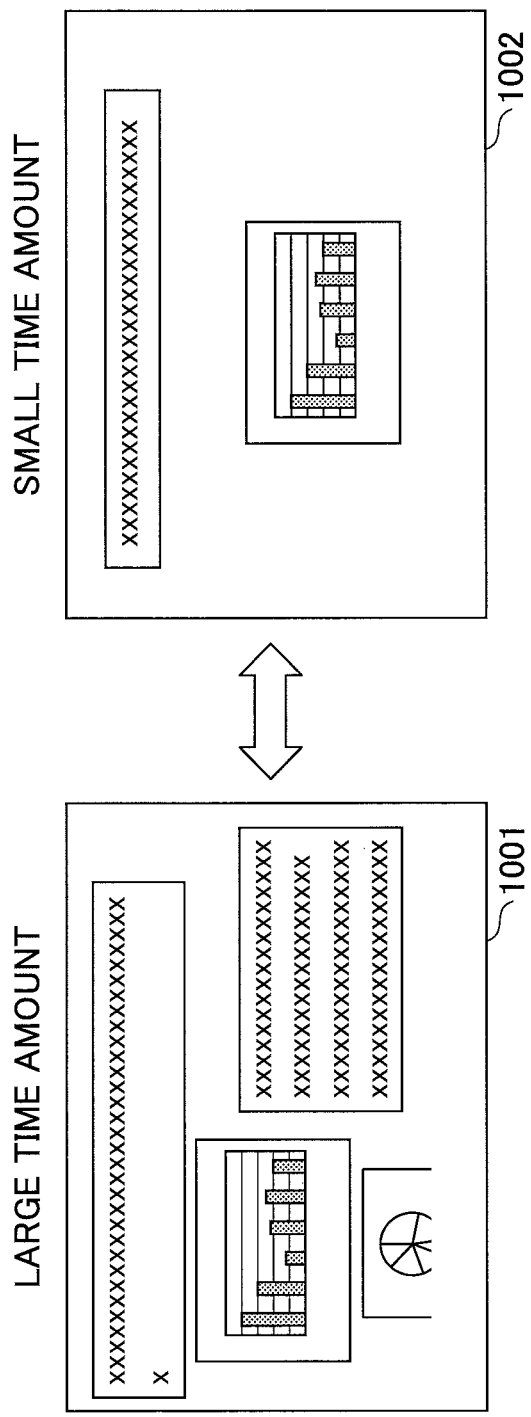
FIG. 5 is an image diagram of an example expressing the relationship between the complexity and the extent of the scheduled time amount for each page.

FIG. 5 is an image diagram of an example expressing the relationship between the complexity and the extent of the scheduled time amount for each page. A page 1001 on the left side of FIG. 5 is an image diagram of a page having a high level of complexity. A page 1002 on the right side of FIG. 5 is an image diagram of a page having a low level of complexity. In the electronic conference system 1 according to the present embodiment, it is assumed that the scheduled time amount increases as the complexity increases. The page 1001 on the left side has larger numbers of characters and diagrams than those of the page 1002 on the right side. Therefore, the page 1001 on the left side has a larger scheduled time amount than that of the page 1002 on the right side.

Note that the terminal device 11 operated by the viewer of the conference may have the same software configuration as that of the terminal device 10 operated by the presenter of the conference. In this case, the terminal device 11 operated by the viewer of the conference can determine that the viewer is operating from the presenter right managing unit 91 of the conference unit 90. The terminal device 11 does not display the progress or the warning described below displayed on the terminal device 10 operated by the presenter.

Furthermore, the display unit 70 may display, on the terminal device 11 operated by the viewer, the progress and the warning described below displayed on the terminal device 10 operated by the presenter. In this case, the display of the progress and warning described below is shared by the presenter and the viewer.

The terminal device 11 operated by the viewer of the conference includes a function of displaying the conference material and a function of receiving common information from the terminal device 10 and applying, to the displayed conference material, actions such as turning pages performed by the presenter of the conference.

Process Detail

In the following, a description is given of details of the process of the electronic conference system 1 according to the present embodiment.

Process Up To Calculating Scheduled Time Amount

Figure 6:
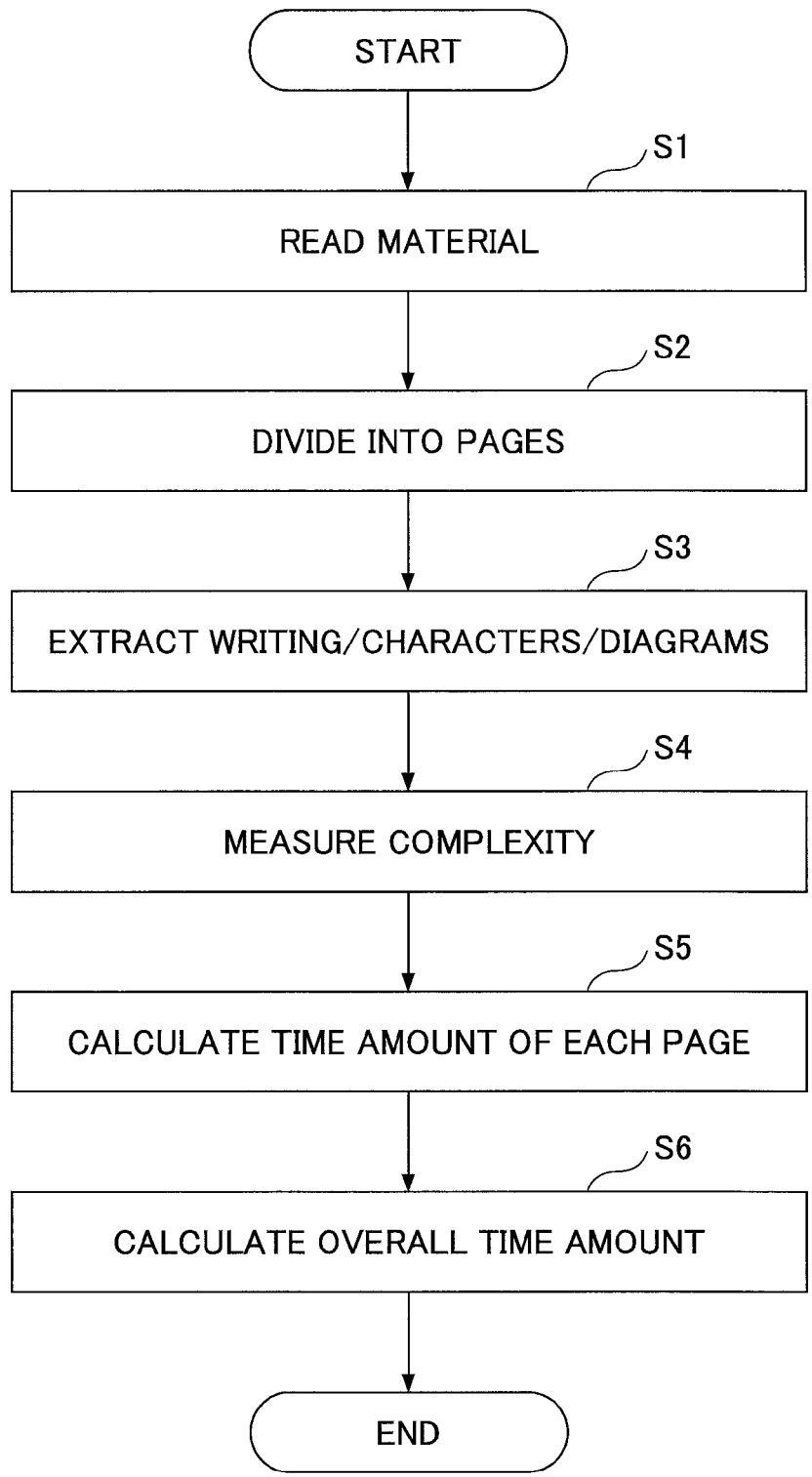
FIG. 6 is a flowchart of an example of a process up to calculating a scheduled time amount.

FIG. 6 is a flowchart of an example of a process up to calculating the scheduled time amount. In step S1, the content reading unit 20 reads, for each conference, the conference material to be used in the conference. In step S2, the content reading unit 20 divides the read conference material into pages.

In step S3, the content reading unit 20 extracts the writing, the characters, and the diagrams from each of the pages obtained by the division. In step S4, the complexity measuring unit 30 measures the complexity from the writing, the characters, and the diagrams of each page extracted by the content reading unit 20, and creates the parameters relevant to the time amount indicated in FIG. 7. FIG. 7 is a configuration diagram of examples of parameters relevant to the time amount. In FIG. 7, the items are the same as the parameters relevant to the time amount of FIG. 4, and therefore descriptions are omitted.

In step S5, the time amount measuring unit 40 calculates the scheduled time amount of each page of the conference material, from the parameters relevant to the time amount of FIG. 7. For example, the time amount measuring unit 40 uses, as expressed in formula (1), the parameters that can be acquired from each page of the conference material among the parameters relevant to the time amount of FIG. 7, to quantitatively calculate the scheduled time amount.

$$Tp=(c \times tc + g \times tg) \times \alpha \qquad (1)$$

Note that Tp is the scheduled time amount of the page. The number of characters in the page is expressed by c. The scheduled time amount for each character is expressed by tc. The number of diagrams in the page is expressed by g. The scheduled time amount for each diagram is expressed by tg. The readability of the writing is expressed by $\alpha$.

Furthermore, the time amount measuring unit 40 uses, as expressed in formula (2), the speed specifying coefficient of the presenter ($\gamma$) and the record of the past time amount (tr) among the parameters relevant to the time amount of FIG. 7, to quantitatively calculate the scheduled time amount.

$$Tp = tr \times \gamma \qquad (2)$$

In step S6, the time amount measuring unit 40 performs multiplication on the scheduled time amounts of the pages as expressed in formula (3), to calculate the scheduled time amount of each conference material. Furthermore, the time amount measuring unit 40 performs multiplication on the scheduled time amounts of the conference materials as expressed in formula (4), to calculate the overall scheduled time amount. The predicted end time is the start time of the conference+the overall scheduled time amount.

$$T_d = \Sigma_1^P T_p \qquad (3)$$

$$T = \Sigma_1^d T_d \qquad (4)$$

Note that in formula (3), Td is the scheduled time amount of the conference material. Furthermore, in formula (4), T is the overall scheduled time amount.

Figure 8A:
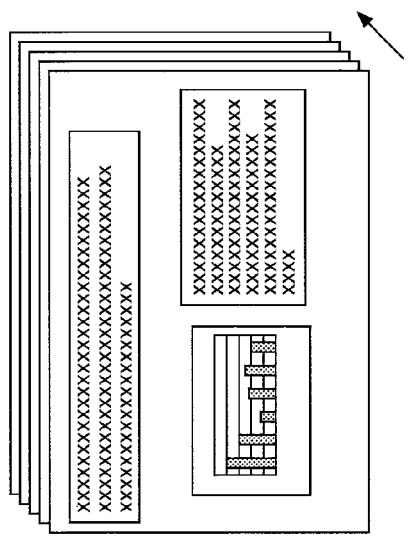
FIGS. 8A and 8B are image diagrams of examples of a process of calculating the scheduled time amount of the conference from the scheduled time amount of each of the pages.
Figure 8B:
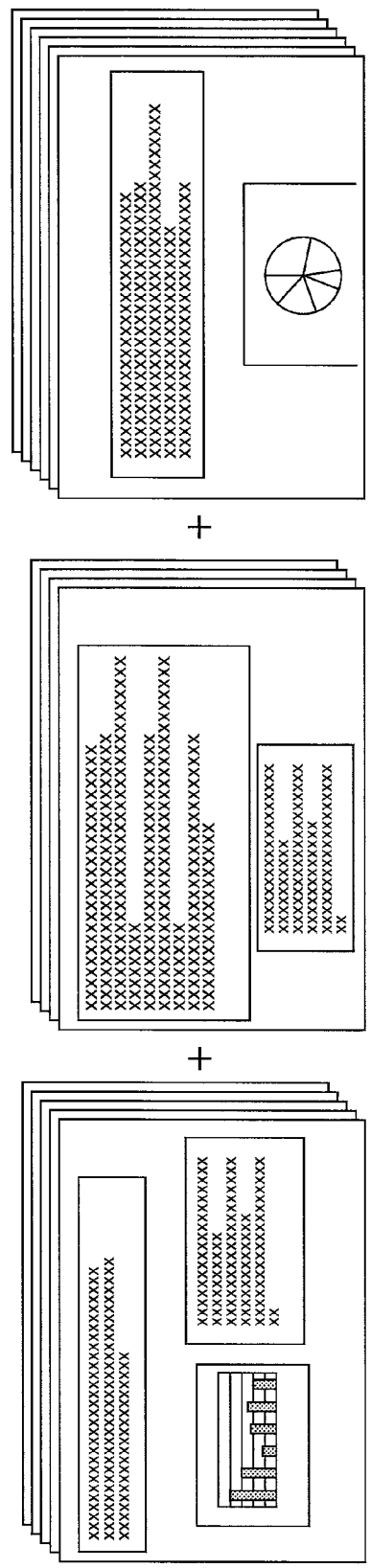

The process of step S6 of calculating the scheduled time amount of each conference material by performing multiplication on the scheduled time amounts of the pages, is a process as expressed by an image of FIG. 8A. Furthermore, the process of step S6 of calculating the overall scheduled time amount by performing multiplication on the scheduled time amounts of the conference materials, is a process as expressed by an image of FIG. 8B. FIGS. 8A and 8B are image diagrams of examples of a process of calculating the scheduled time amount of the conference from the scheduled time amount of each of the pages.

As illustrated in FIG. 8A, the scheduled time amount of each conference material is the total sum of the scheduled time amounts of the pages. Furthermore, as illustrated in FIG. 8B, the scheduled time amount of the conference is the total sum of the scheduled time amounts of the conference materials.

Process Up To Displaying Progress

Figure 9:
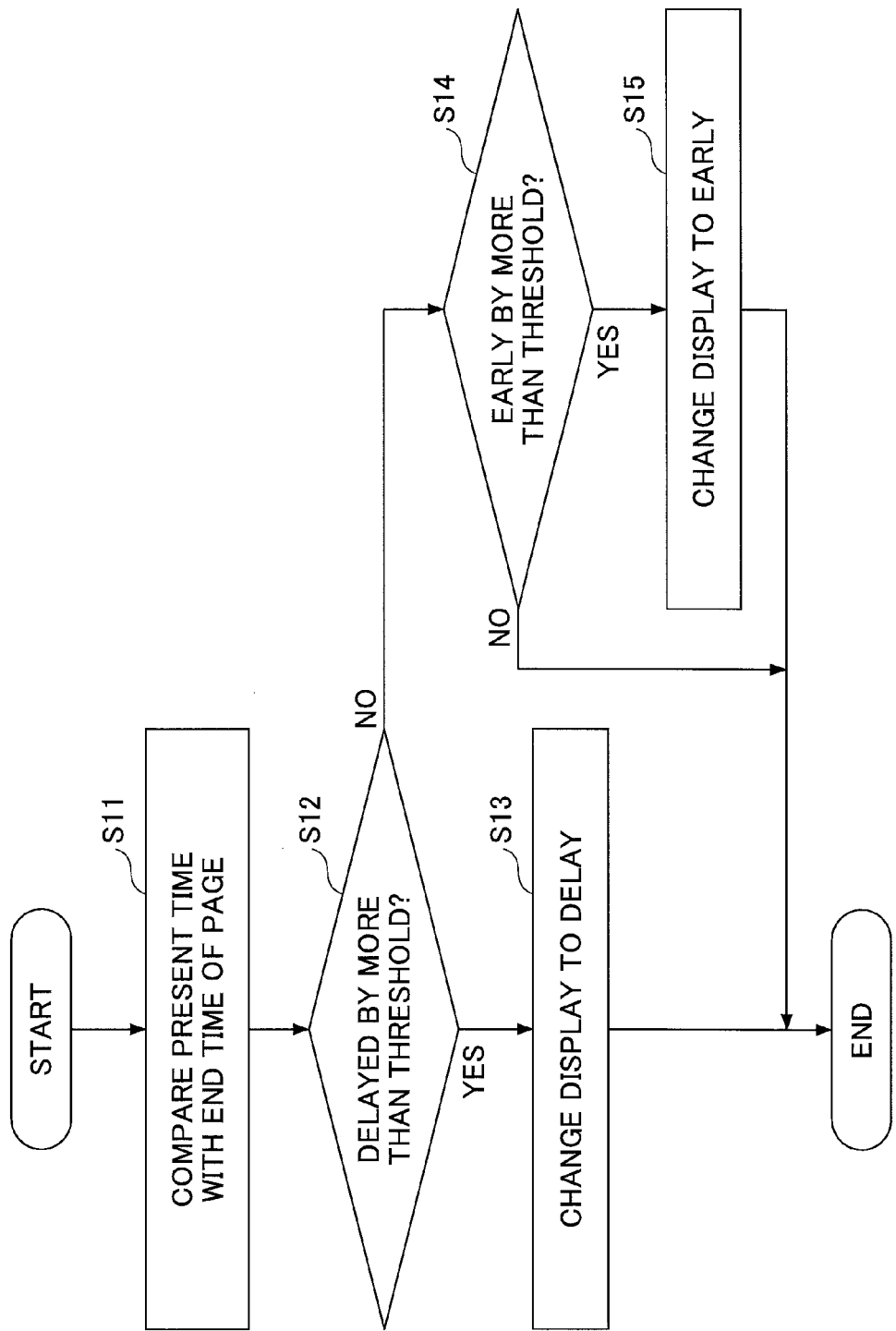
FIG. 9 is a flowchart of an example of a process up to displaying the progress.

FIG. 9 is a flowchart of an example of a process up to displaying the progress. For example, the process of the flowchart of FIG. 9 is performed at the timing when a page is turned.

In step S11, the progress managing unit 50 compares the present time with the scheduled end time of the page. In step S12, when the present time is delayed from the scheduled end time of the page by more than a threshold, the progress managing unit 50 proceeds to step S13, and indicates a warning by changing the display of the progress to "delayed" on the display unit 70.

In step S12, when the present time is not delayed from the scheduled end time of the page by more than a threshold, the progress managing unit 50 proceeds to step S14. When the present time is earlier than the scheduled end time of the page by more than a threshold, the progress managing unit 50 proceeds to step S15, and indicates a warning by changing the display of the progress to "early" on the display unit 70. Note that in step S14, when the present time is not earlier than the scheduled end time of the page by more than a threshold, the progress managing unit 50 does not change the display of the process to "delay" or to "early" on the display unit 70, and ends the process of the flowchart of FIG. 9.

For example, there may be a progress warning display as illustrated in FIGS. 10A and 10B. FIGS. 10A and 10B are image diagrams of examples of a progress warning display. In FIGS. 10A and 10B, the scheduled end times of the pages are expressed by a bar graph in the top stage, and the times when each of the pages are turned (the actual end times of the pages) are expressed by a bar graph in the bottom stage.

FIG. 10A illustrates an example of a progress warning display when the present time is delayed from the scheduled end time of the page by more than a threshold. In the progress warning display of FIG. 10A, a delay of three pages (behind schedule) is expressed by a red color, and the difference between the scheduled end time and the actual end time is expressed by an arrow.

Furthermore, FIG. 10B illustrates an example of a progress warning display when the present time is earlier than the scheduled end time of the page by more than a threshold. In the progress warning display of FIG. 10B, a speed up of four pages (ahead of schedule) is expressed by a blue color, and the difference between the scheduled end time and the actual end time is expressed by an arrow.

Figure 11:
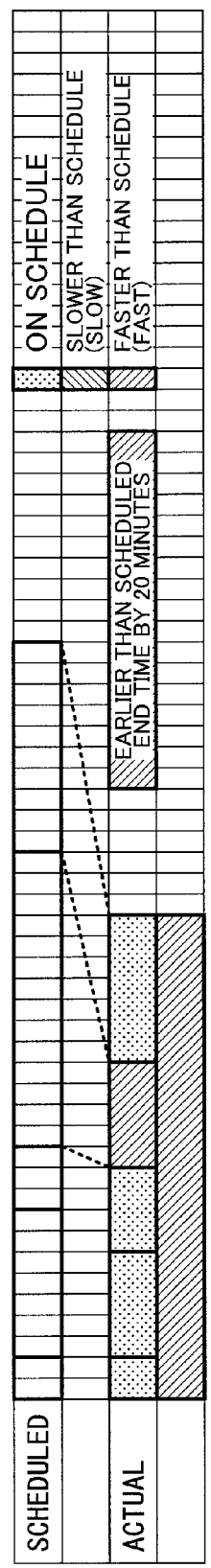
FIG. 11 is an image diagram of another example of a progress warning display.

There may also be a progress warning display as illustrated in FIG. 11. FIG. 11 is an image diagram of another example of a progress warning display. In FIG. 11, the scheduled end times of the pages are expressed by a bar graph in the top stage, the times when each of the pages are turned (the actual end times of the pages) are expressed by a bar graph in the middle stage, and the time when a page has been turned last (time amount of conference until page is turned last) is expressed by a bar graph in the bottom stage.

FIG. 11 indicates a progress warning display for each page, and indicates a progress warning display relevant to the scheduled time amount of the conference up to the page that has been turned and the actual time amount of the conference. For example, in FIG. 11, it is expressed that the time amount of the fourth page (time during which the fourth page has been displayed) is shorter than the scheduled time amount of the fourth page by more than a threshold, by a blue color at a portion corresponding to the fourth page in the middle stage.

Furthermore, in FIG. 11, it is expressed that the actual time amount of the conference until turning the fifth page is shorter than the scheduled time amount of the conference until turning the fifth page, by a bar graph of a blue color in the bottom stage. Furthermore, in FIG. 11, it is expressed by text as to how much the actual time amount of the conference is deviated with respect to the scheduled time amount of the conference up to turning the fifth page (deviated by how many minutes).

FIG. 12 is a flowchart of an example of a process of displaying the progress by each page. For example, the process of the flowchart of FIG. 12 is performed at the timing of turning a page. Note that the process of the flowchart of FIG. 12 may be performed at predetermined time intervals.

In step S21, the progress managing unit 50 acquires the time amount of the present page (the time during which the turned page has been displayed). In step S22, the progress managing unit 50 determines whether the time amount of the present page is different from the scheduled time amount of the page by more than a threshold.

When the difference is more than a threshold, in step S23, the progress managing unit 50 determines whether the time amount of the present page is too slow (too short) in comparison to the scheduled time amount of the page. When the time amount of the present page is too slow in comparison to the scheduled time amount of the page, in step S24, the progress managing unit 50 displays a warning indicating behind schedule. Furthermore, when the time amount of the present page is too fast in comparison to the scheduled time amount of the page, in step S25, the progress managing unit 50 displays a warning indicating ahead of schedule.

In step S22, when the time amount of the present page is not different from the scheduled time amount of the page by more than a threshold, the progress managing unit 50 does not display a warning, and ends the process of the flowchart of FIG. 12. Note that the process of the flowchart of FIG. 12 is performed for each page, every time the time amounts are multiplied, such as when returning to a page.

Figure 13A:
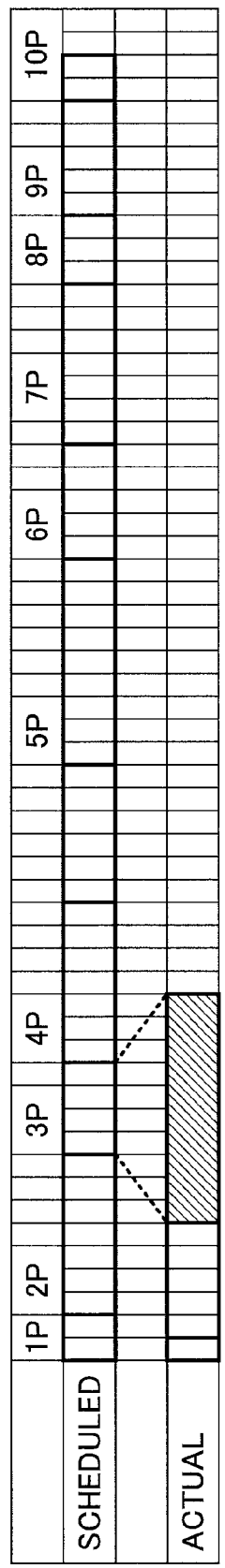
FIGS. 13A and 13B are image diagrams of examples of a progress warning display for each page.
Figure 13B:
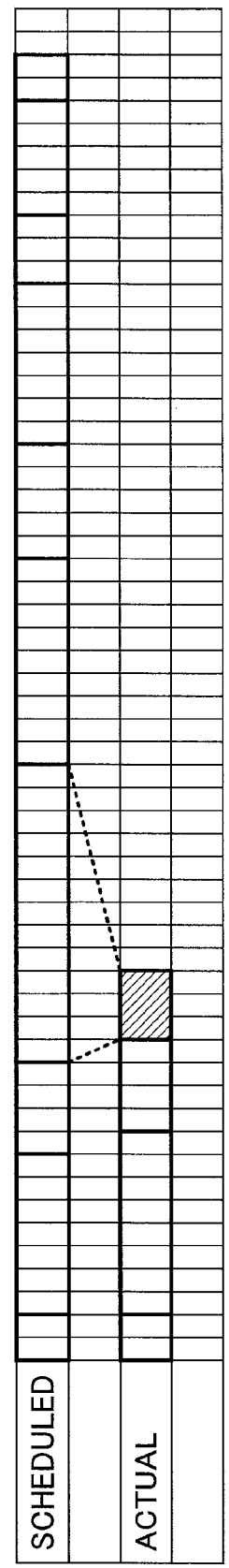

For example, there may be a progress warning display for each page as illustrated in FIGS. 13A and 13B. FIGS. 13A and 13B are image diagrams of examples of a progress warning display for each page. In FIGS. 13A and 13B, the scheduled time amounts of the pages are expressed by a bar graph in the top stage, and the time amounts of each of the pages (the actual time during which each page has been displayed) are expressed by a bar graph in the bottom stage.

FIG. 13A illustrates an example of a progress warning display when there is a delay in the time amount of the third page with respect to the scheduled time amount of the third page by more than a threshold. In the progress warning display of FIG. 13A, the delay of the third page is expressed by a red color in the area indicating the third page in the bar graph.

FIG. 13B illustrates an example of a progress warning display when there is a speed up in the time amount of the fourth page with respect to the scheduled time amount of the fourth page by more than a threshold. In the progress warning display of FIG. 13B, the speed up of the fourth page is expressed by a blue color in the area indicating the fourth page in the bar graph.

Update of Scheduled Time Amount of Each Page

FIG. 14 is a flowchart of an example of a process of updating the scheduled time amount of each page. When an instruction to change the scheduled time amount of each page is given by the presenter, in step S31, the progress managing unit 50 acquires the scheduled time amount of the page specified by the presenter.

In step S32, the progress managing unit 50 determines whether the presenter has given an instruction to increase the scheduled time amount. When the presenter has given an instruction to increase the scheduled time amount, the progress managing unit 50 proceeds to step S33, and increases the scheduled time amount of the page specified by the presenter. When the presenter has given an instruction to decrease the scheduled time amount, the progress managing unit 50 proceeds to step S34, and decreases the scheduled time amount of the page specified by the presenter.

Figure 15:
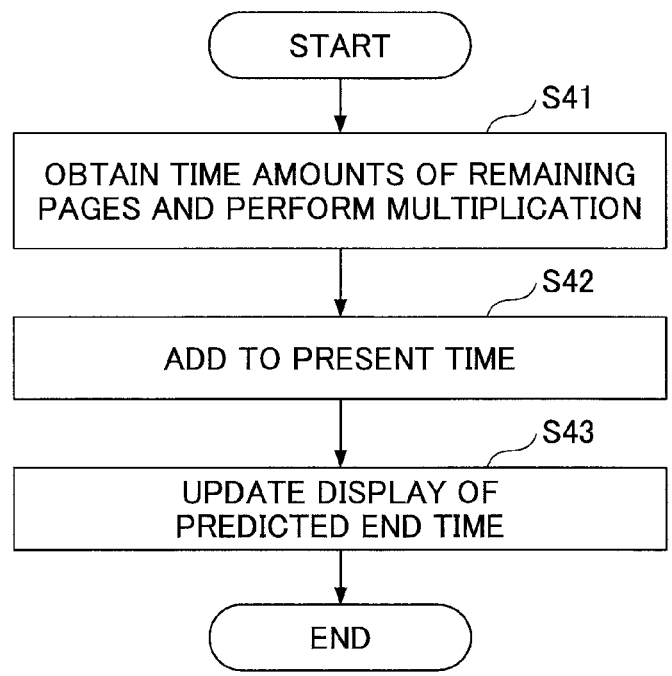
FIG. 15 is a flowchart of an example of a process of updating the predicted end time of the conference.

When the presenter updates the scheduled time amount of each page, the progress managing unit 50 performs the process of the flowchart illustrated in FIG. 15, and also updates the predicted end time of the conference. FIG. 15 is a flowchart of an example of a process of updating the predicted end time of the conference.

In step S41, the progress managing unit 50 performs multiplication on the scheduled time amounts of the remaining pages and calculates the scheduled time amount until the conference ends. In step S42, the progress managing unit 50 adds the scheduled time amount until the conference ends to the present time, to calculate the predicted end time of the conference. In step S43, the progress managing unit 50 updates the predicted end time of the conference displayed by the display unit 70, to the predicted end time of the conference calculated in step S42.

Note that the process of the flowchart of FIG. 15 may be performed when a page is turned, or at predetermined time intervals, other than when the presenter has updated the scheduled time amount of each page.

Figure 16:
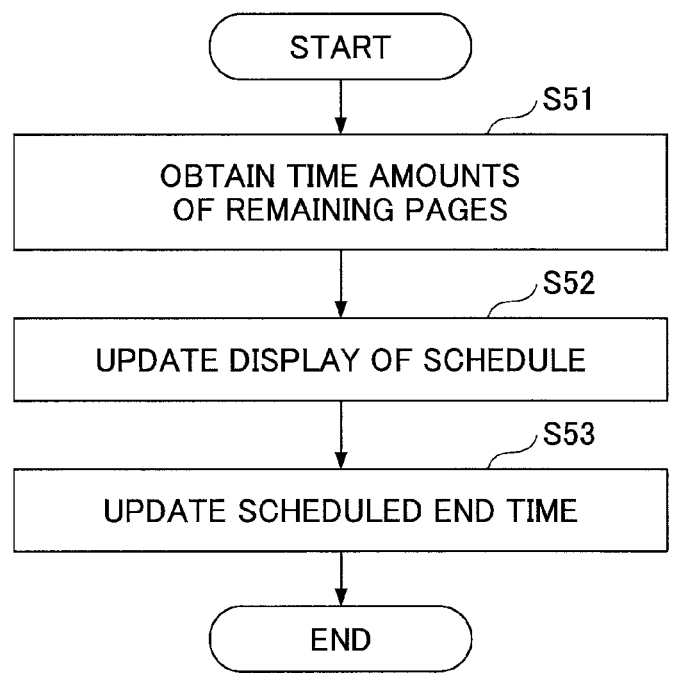
FIG. 16 is a flowchart of an example of a process of updating the scheduled time amount of the conference.

When the presenter updates the scheduled time amount of each page or the overall conference, the progress managing unit 50 performs the process of the flowchart illustrated in FIG. 16, and also updates the scheduled time amount of the conference. FIG. 16 is a flowchart of an example of a process of updating the scheduled time amount of the conference.

In step S51, the progress managing unit 50 performs multiplication on the scheduled time amounts of the remaining pages and calculates the scheduled time amount until the conference ends. In step S52, the progress managing unit 50 updates the display of the schedule on the display unit 70. The display of the schedule is, for example, the display of the scheduled time amount of each page (for example, the bar graph described above).

Then, in step S53, the progress managing unit 50 adds the scheduled time amount until the conference ends to the start time of the conference to calculate the scheduled end time of the conference, and updates the display of the scheduled end time on the display unit 70.

Figure 17A:
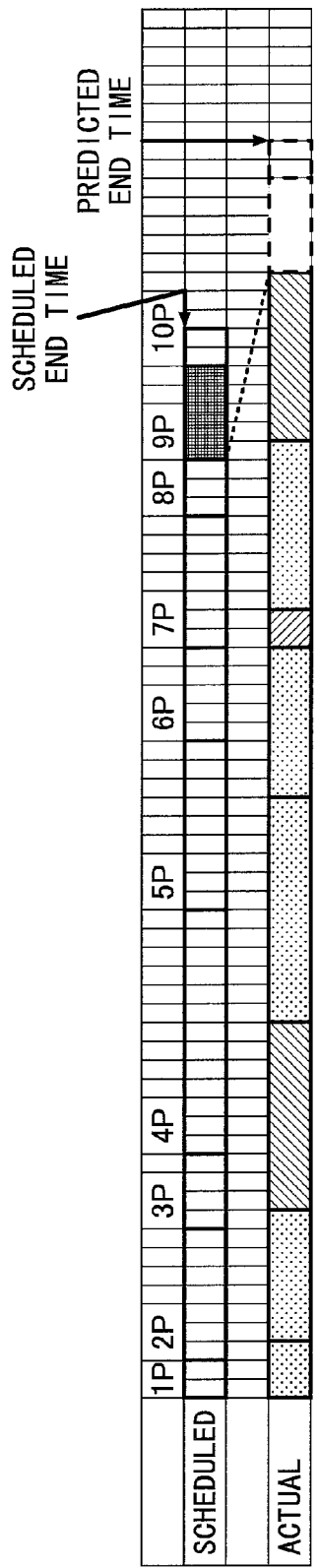
FIGS. 17A and 17B are image diagrams of examples expressing the updating of a progress warning display for each page.
Figure 17B:
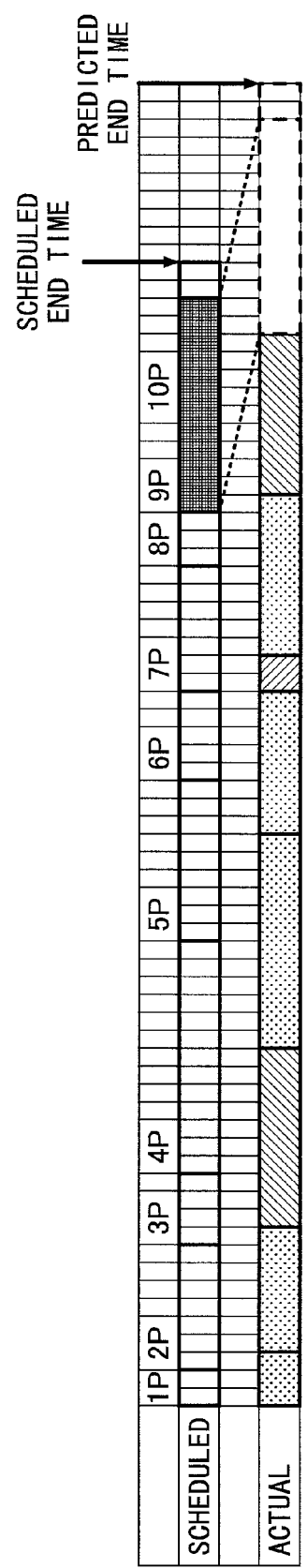

For example, the progress warning display of each page is updated as illustrated in FIGS. 17A and 17B, by performing the processes of the flowcharts of FIGS. 15 and 16. FIGS. 17A and 17B are image diagrams of examples expressing the updating of a progress warning display for each page. Similar to FIGS. 13A and 13B, in FIGS. 17A and 17B, the scheduled time amounts of the pages are expressed by a bar graph in the top stage, and the time amounts of each of the pages (the actual time during which each page has been displayed) are expressed by a bar graph in the bottom stage.

FIG. 17A illustrates a progress warning display before being updated. FIG. 17B illustrates the progress warning display of FIG. 17A after being updated by increasing the scheduled time amount of the ninth page. By increasing the scheduled time amount of the ninth page, in the progress warning display in FIG. 17B, the scheduled end time in the top stage and the scheduled end time in the bottom stage are delayed.

Example of Screen

Figure 18:
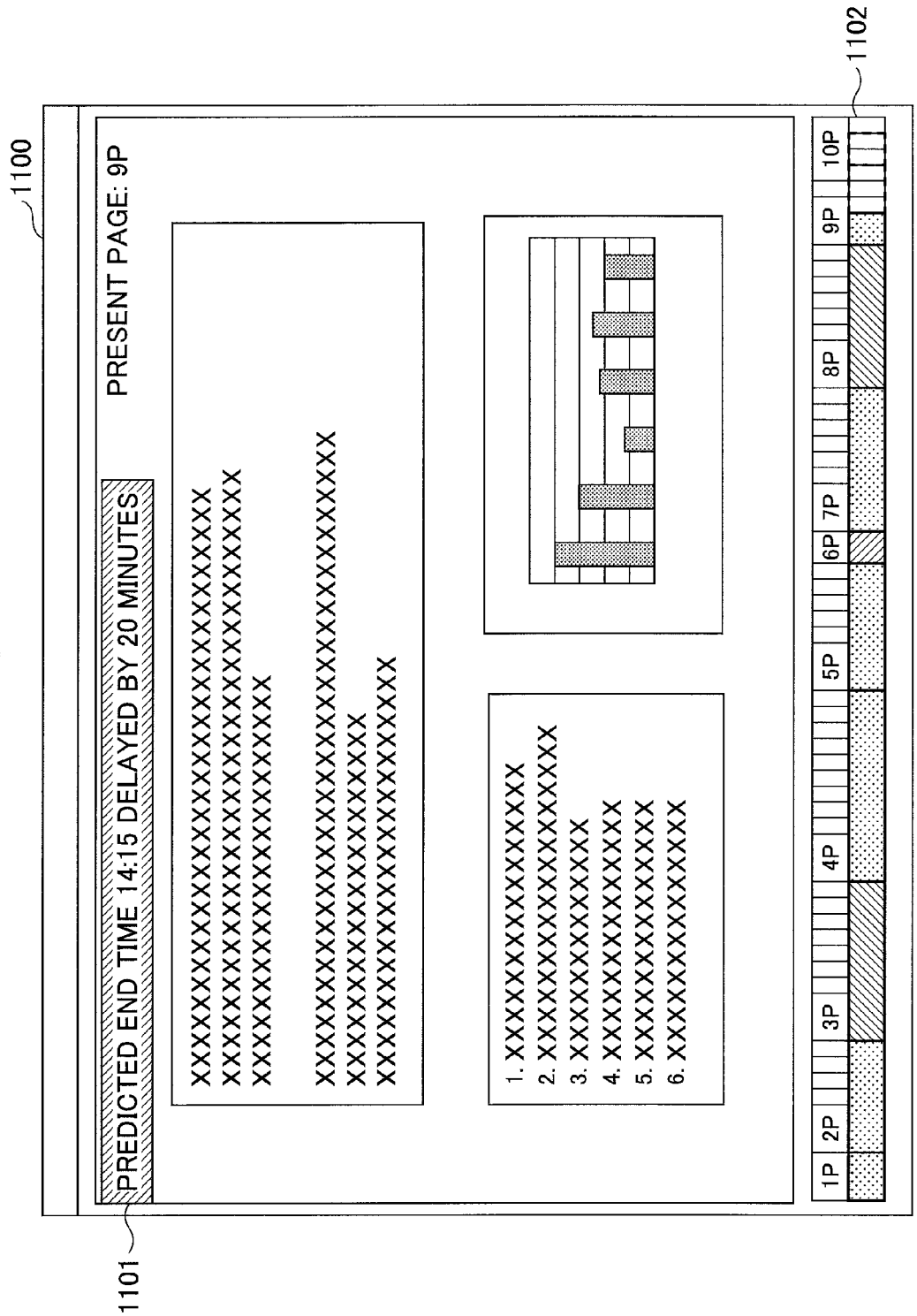
FIG. 18 is an image diagram of an example of a screen displayed on the terminal device of the presenter during the conference.

For example, the presenter can switch between displaying and hiding the progress warning display and change the items to be displayed, by a simple operation. FIG. 18 is an image diagram of an example of a screen displayed on the terminal device of the presenter during the conference.

In a screen 1100 of FIG. 18, the predicted end time and the predicted delay time of the conference are displayed in a top area 1101, and the difference between the scheduled time amount and the actual time amount of each page is displayed by a color in a bottom area 1102. For example, the presenter can easily confirm the page whose actual time amount is too short compared to the scheduled time amount (possibly insufficient explanations) by referring to the bottom area 1102, and therefore the presenter can take measures such as adding explanations later.

FIGS. 19A and 19B are image diagrams of another example of a screen displayed on the terminal device of the presenter during the conference. In a screen 1200 of FIGS. 19A and 19B, the predicted end time of the conference is displayed in a top area 1201, and the scheduled time amount and the actual time amount of each page are displayed in a bottom area 1202. For example, the presenter can compare the scheduled time amount and the actual time amount, by referring to the bottom area 1202.

FIG. 19A illustrates an example where the actual time amount of the fourth page is too short compared to the scheduled time amount of the fourth page. Accordingly, as illustrated in FIG. 19A, a warning indicating that there is a page whose actual time amount is too short compared to the scheduled time amount (possibly insufficient explanations) is shown in the bottom area 1202. Note that in the bottom area 1202, the difference between the actual end time and the scheduled end time of the conference (20 minutes early) is also displayed.

FIG. 19B illustrates an example where the actual time amount of the fourth page is too long compared to the scheduled time amount of the fourth page. Accordingly, as illustrated in FIG. 19B, in the bottom area 1202, the difference between the actual end time and the scheduled end time of the conference (5 minutes late) is displayed.

Figure 20:
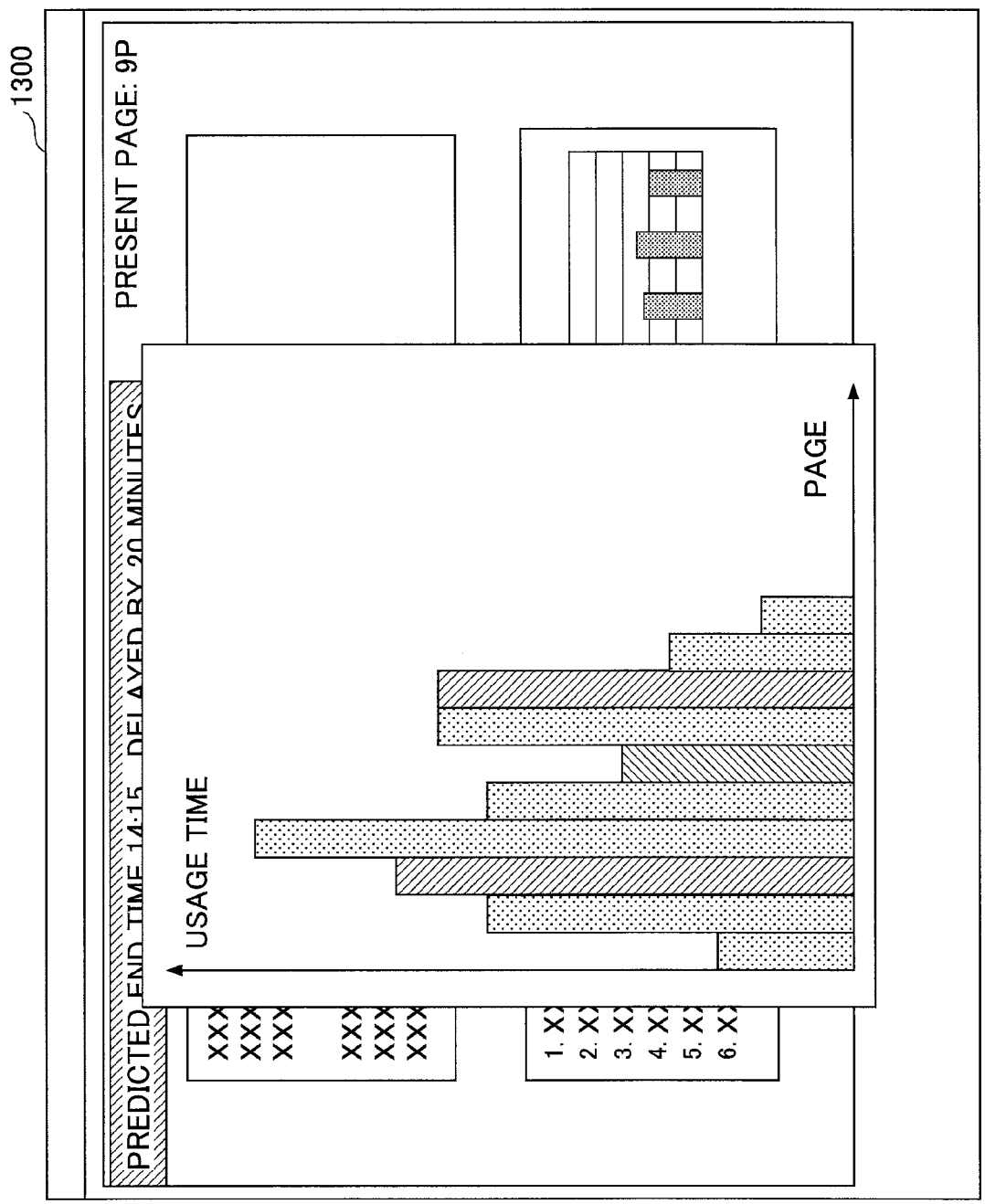
FIG. 20 is an image diagram of an example of a screen displayed on the terminal device of the presenter after the conference.

Furthermore, after the conference, the terminal device 10 displays, for example, a screen 1300 illustrated in FIG. 20, according to an instruction from the presenter. FIG. 20 is an image diagram of an example of a screen displayed on the terminal device of the presenter after the conference. The screen 1300 of FIG. 20 displays the difference between the scheduled time amount and the actual time amount of each page. For example, in the screen 1300, colors are used to distinguish between a page whose difference between the scheduled time amount and the actual time amount is small, a page whose actual time amount is too long compared to the scheduled time amount, and a page whose actual time amount is too short compared to the scheduled time amount. The presenter can confirm the speed of the conference and the imbalance in the volumes of the pages by viewing the screen 1300, and apply this information to the next presentation.

Note that the presenter can make gestures and operate buttons with respect to the terminal device 10, to switch the screen to, for example, the screen 1300 of FIG. 20, display other information, and operate the scheduled time amount.

FIG. 21 illustrates an example of an operation by the presenter for switching the screen. In the screen on the left side of FIG. 21, the presenter touches the touch panel of the terminal device 10 so as to draw a line from the bottom to the top, so that the screen 1300 of FIG. 20 is displayed as in the right side of FIG. 21.

FIG. 22 illustrates an example of an operation by the presenter for confirming a warning display. In the screen on the left side of FIG. 22, the presenter touches the area of the page in which a warning is displayed by the touch panel of the terminal device 10, so that the contents of the warning is displayed as in the right side of FIG. 22.

Figure 23:
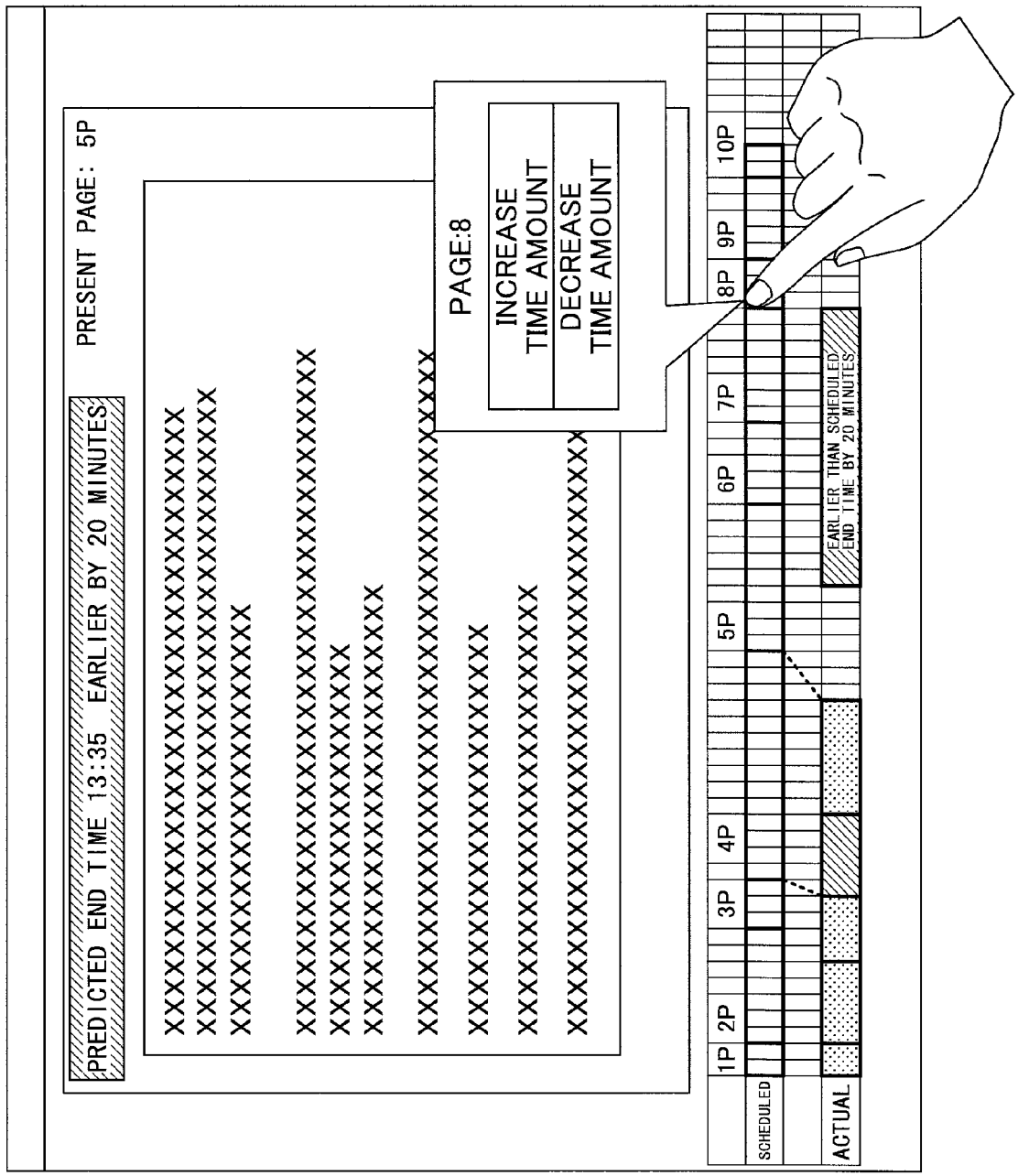
FIG. 23 illustrates an example of an operation by the presenter for operating the scheduled time amount.

FIG. 23 illustrates an example of an operation by the presenter for operating the scheduled time amount. In order to change the scheduled time amount of a page during a conference or before a conference, the presenter touches the area of the page for which the scheduled time amount is to be operated in the screen of FIG. 23 by the touch panel of the terminal device 10, so that a button for increasing or decreasing the scheduled time amount is displayed. Note that when the button for increasing or decreasing the scheduled time amount is pressed, the terminal device 10 executes the process of the flowchart of FIG. 14 described above.

Figure 24:
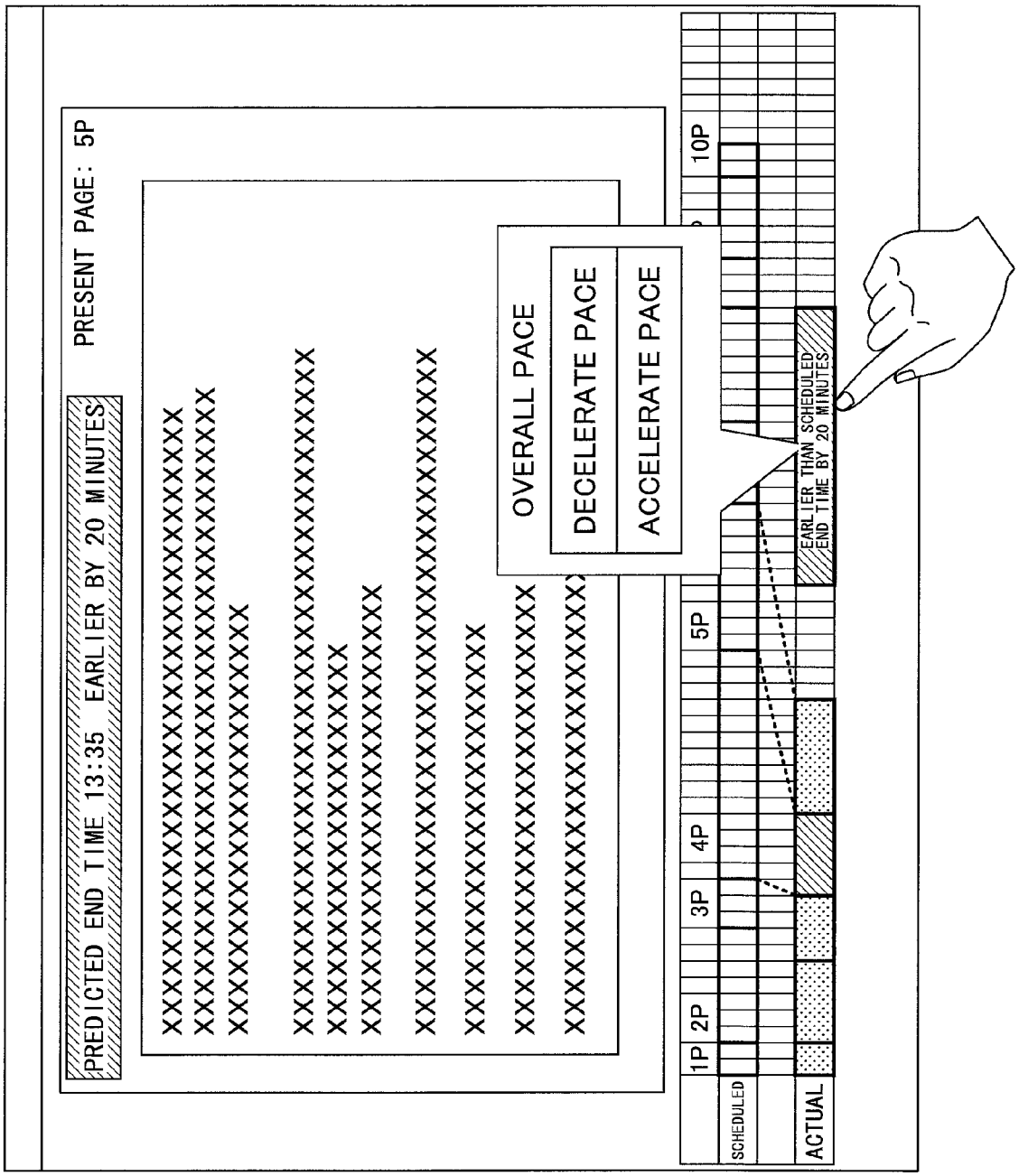
FIG. 24 illustrates an example of an operation by the presenter for operating the overall scheduled time amount.

FIG. 24 illustrates an example of an operation by the presenter for operating the overall scheduled time amount. In order to change the overall scheduled time amount during a conference, the presenter touches the area of the progress warning display in the screen of FIG. 24 by the touch panel of the terminal device 10, so that a button for increasing or decreasing the overall scheduled time amount (for changing the pace) is displayed.

Note that when the button for changing the pace is pressed, the terminal device 10 updates the scheduled time amounts of the reaming pages by the process of the flowchart of FIG. 14 described above. Furthermore, by the processes of the flowcharts of FIGS. 15 and 16, the terminal device 10 updates the scheduled time amount and the predicted end time, and then displays again the screen of FIG. 24.

Overview (First Embodiment)

The electronic conference system 1 according to the present embodiment can indicate the progress of the conference to the presenter in an easily comprehensible manner, by visibly displaying the difference between the scheduled time amount and the actual time amount. Furthermore, the electronic conference system 1 according to the present embodiment can predict the end time of the conference from the difference between the scheduled time amount and the actual time amount, and indicate the predicted end time of the conference to the presenter.

Therefore, the electronic conference system 1 according to the present embodiment can support the presenter in determining the progress of the display of the conference material, when the presenter gives explanations while displaying the conference material. For example, by using the electronic conference system 1 according to the present embodiment, the presenter can easily confirm the excess and shortage of explanations for each of the pages of the conference material and the difference between the scheduled end time of the conference and the predicted end time of the conference based on the actual time amounts of the pages, and therefore the presenter can easily control the pace of explanations.

Note that as an example of displaying information to the presenter in an easily comprehensible manner, colors are used in the above description; however, various display methods are conceivable other than colors, such as hatching, pop-up, and blinking.

Furthermore, the electronic conference system 1 according to the present embodiment can acquire parameters for measuring the time amount from the conference material (parameters relevant to the time amount), and calculate the scheduled time amount of the conference from the parameters relevant to the time amount. Therefore, the electronic conference system 1 according to the present embodiment can easily calculate the scheduled time amount of the conference by specifying the conference material used in the conference.

Note that in the above description, the scheduled time amount of the conference is automatically calculated from parameters relevant to the time amount; however, the presenter may manually set the scheduled time amount of the conference.

Second Embodiment

An electronic conference system according to a second embodiment uses a server device. The electronic conference system according to the second embodiment is the same as the electronic conference system according to the first embodiment except for some parts, and therefore redundant descriptions are omitted.

Figure 25:
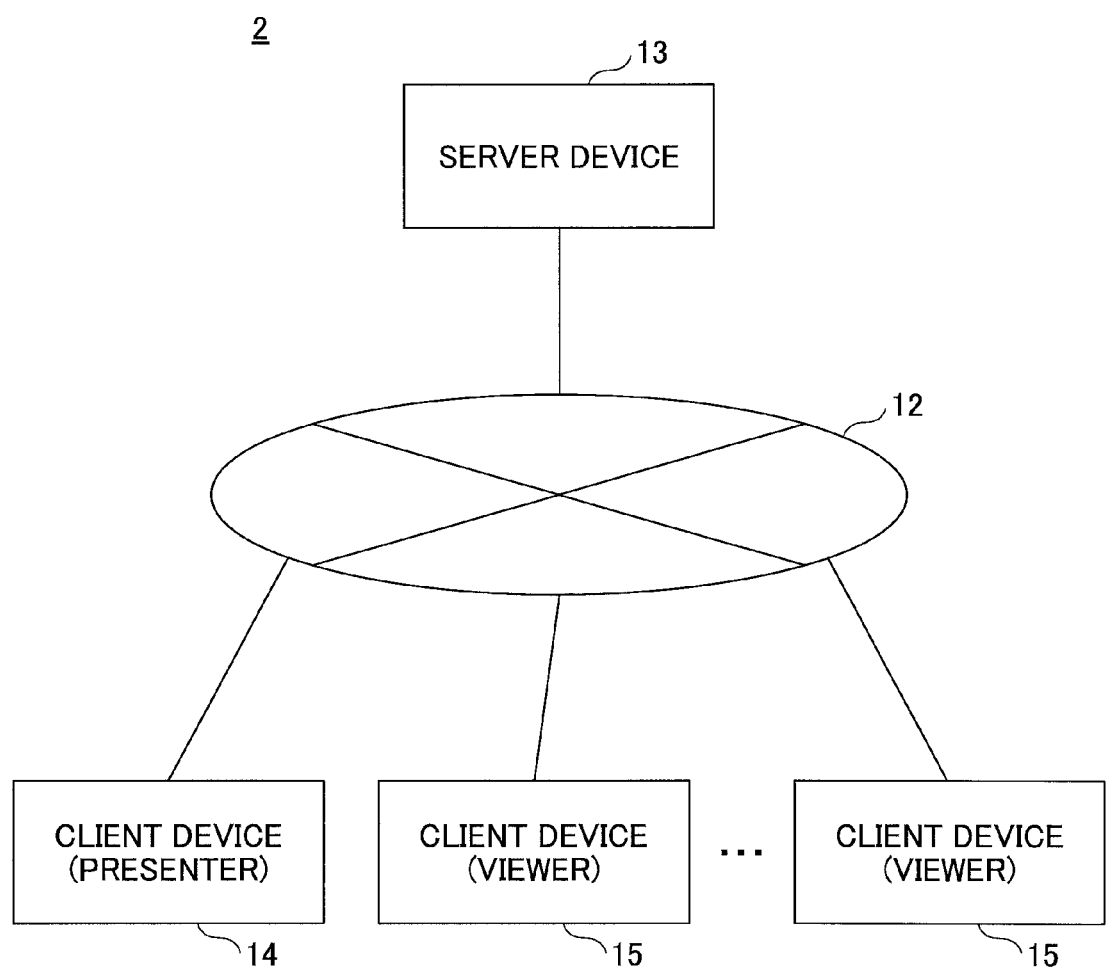
FIG. 25 illustrates an example of an electronic conference system according to a second embodiment.

FIG. 25 illustrates an example of an electronic conference system according to a second embodiment. An electronic conference system 2 of FIG. 25 includes a server device 13, a client device 14 of the presenter, and one or more client devices 15 of viewers, which are connected to a network 12 such as the Internet and a LAN.

The server device 13 may be software and services operating in a plurality of computer systems, or may be software and services operating in a single computer system. The server device 13 may have a format of, for example, a cloud service.

The client device 14 is an information processing terminal operated by the presenter of the conference. The client device 15 is an information processing terminal operated by the viewer (attendee other than presenter) of the conference. The client devices 14 and 15 are devices that can process information, such as a desktop personal computer, a notebook personal computer, a tablet PC, and a smartphone.

In the electronic conference system 2 of FIG. 25, the processes performed by the terminal device 10 of FIG. 1 are divided between the server device 13 and the client device 14. For example, the electronic conference system 2 may perform the functions of display and UI by the client device 14, and perform other functions by the server device 13. Furthermore, the electronic conference system 2 may perform functions having high load by the server device 13. Note that the hardware configuration is the same as that of FIG. 2, and therefore descriptions are omitted.

Figure 26:
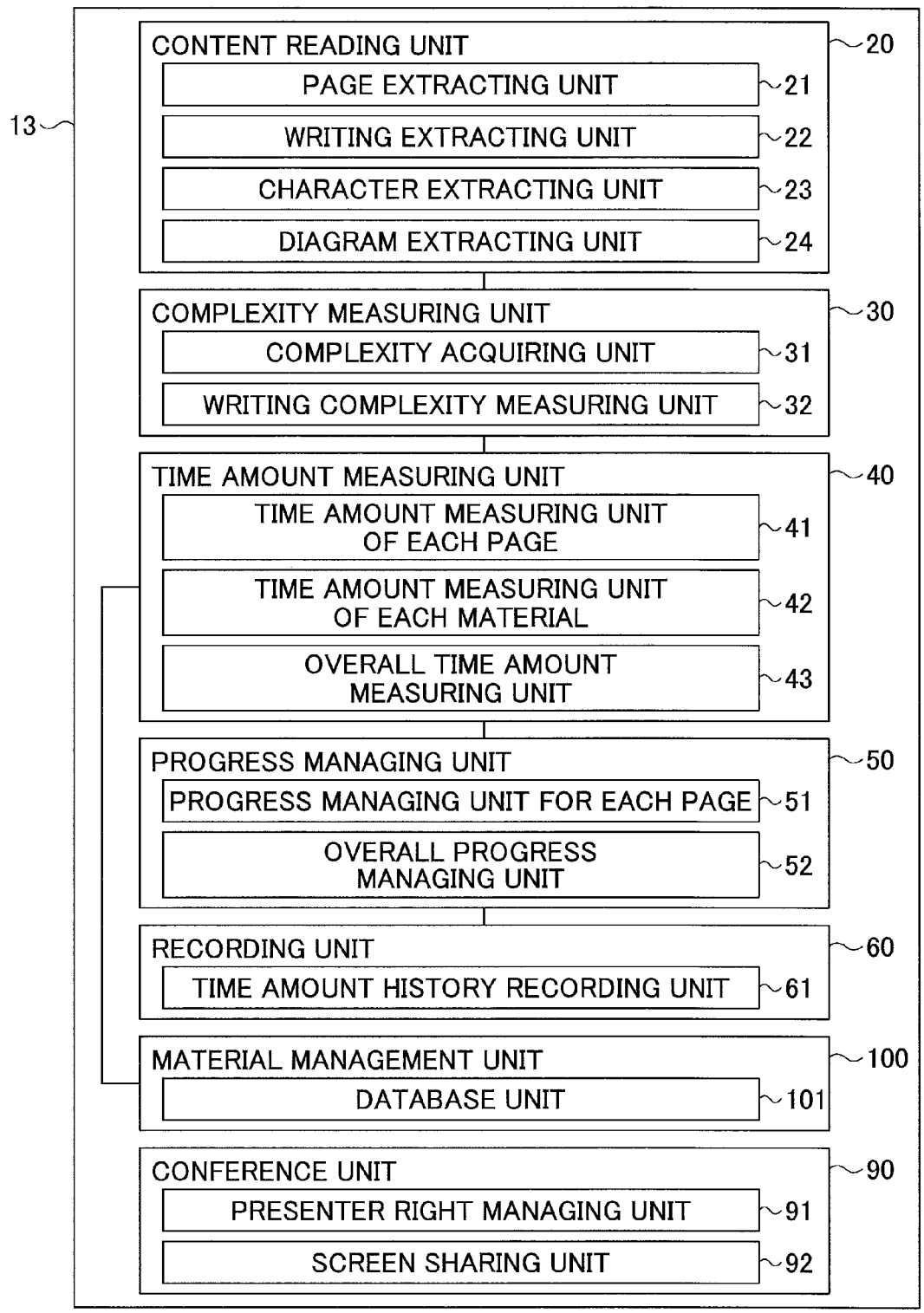
FIG. 26 is a process block diagram of an example of a server device.
Figure 27:
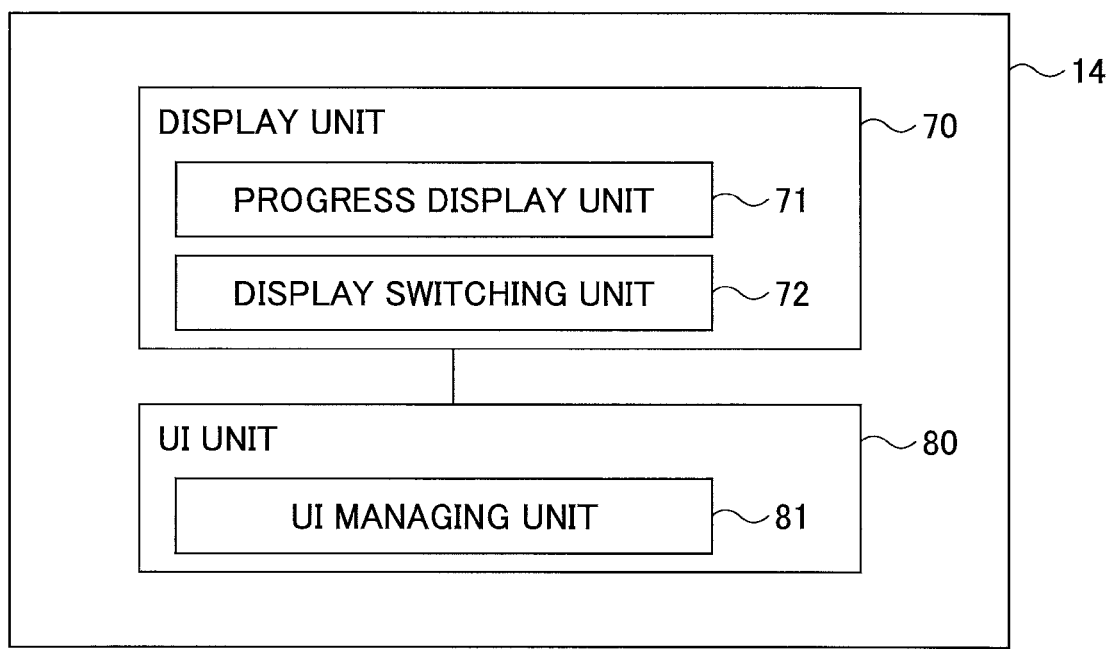
FIG. 27 is a process block diagram of an example of a client device.

FIG. 26 is a process block diagram of an example of the server device 13. FIG. 27 is a process block diagram of an example of the client device 14. The server device 13 of FIG. 26 is constituted by removing the display unit 70 and the UI unit 80 from the process block of the terminal device 10 of FIG. 3 and by adding a material management unit 100. The client device 14 of FIG. 27 includes the display unit 70 and the UI unit 80 of the process block of the terminal device 10 of FIG. 3. Note that the material management unit 100 of the server device 13 includes a database unit 101. The database unit 101 manages the conference material.

In the electronic conference system 2 according to the second embodiment, the processes performed by the terminal device 10 of FIG. 1 are divided between the server device 13 and the client device 14, but the processes themselves are the same as those of the electronic conference system 1 according to the first embodiment, and therefore descriptions are omitted.

Overview (Second Embodiment)

In the electronic conference system 2 according to the present embodiment, some of the processes performed by the terminal device 10 of FIG. 1 can be performed by other devices such as the server device 13. Therefore, the electronic conference system 2 according to the present embodiment can cause the server device 13 perform processes having high load instead of the client device 14, and can provide the processes having high load to the user as a cloud service.

Note that the configuration of the electronic conference system 2 is one example, and various system configurations are possible according to the purpose and the objective. Furthermore, the functional configuration of the electronic conference system 2 is one example, and other functional configurations are possible. For example, some of the functions of the server device 13 may be provided in the client device 14.

According to one embodiment of the present invention, an information display system, an information processing device, and an information display method are provided, which are capable of supporting the operation of determining the progress of information displayed by the user.

The information display system, the information processing device, and the information display method are not limited to the specific embodiments described herein, and variations and modifications may be made without departing from the scope of the present invention. Note that a page of the conference material corresponds to division information.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2012-273436, filed on Dec. 14, 2012, the entire contents of which are hereby incorporated herein by reference.

What is claimed is:

1. An electronic conference system for displaying a conference material including a plurality of pages according to a page operation by a user, the electronic conference system comprising:
at least one processor that executes a program so as to implement:
a progress management unit configured to compare a scheduled time of displaying the conference material with a time that the conference material is actually displayed for each of the pages, and determine a page display progress of the conference material displayed by the page operation of the user;
a complexity measuring unit configured to measure complexity of the conference material for each of the pages by extracting a text including a character and a diagram from each of the pages and measuring the complexity of each of the pages of the conference material based on a number of characters and a number of diagrams included in each of the pages; and
a time amount measuring unit configured to calculate the scheduled time of displaying the conference material for each of the pages, from the complexity of the information; and
a display unit configured to display the page display progress of the conference material compared to the scheduled time of each of the pages, based on the page display progress of the conference material determined by the progress management unit,
wherein the display unit is configured to display a progress warning for each of the pages by expressing a scheduled time amount for each of the pages by a first bar graph and an actual time amount for each of the pages by a second bar graph in comparison with the first bar graph,
wherein the first bar graph is divided into first areas each of which is allocated for each of the pages in proportion to the scheduled time amount of each of the pages, and the second bar graph expresses the actual time amount of each of the pages by a second area proportional to the actual time amount for each of the pages in comparison with each of the first areas allocated for each of the pages, and
wherein the display unit displays the progress warning by expressing the second area for each of the pages in a different manner depending on whether the actual time amount for each of the pages delays for more than a first threshold period of time set for each of the pages or the actual time amount for each of the pages advances earlier than the scheduled time amount by more than a second threshold period of time set for each of the pages.

2. The electronic conference system according to claim 1, wherein
the page operation of the user is an operation of switching a page of the conference material.

3. The electronic conference system according to claim 1, wherein
the progress management unit calculates the scheduled time of displaying the conference material, from a total sum of the scheduled times of displaying each of the pages of the conference material.

4. The electronic conference system according to claim 1, wherein
the time amount measuring unit measures the scheduled time of displaying the conference material, from a record of time that the conference material has been displayed in the past.

5. The electronic conference system according to claim 1, wherein
the display unit visually displays, as the page display progress of the conference material, that the time that the conference material is actually displayed is longer or shorter than the scheduled time of displaying each of the pages of the conference material.

6. The conference material system according to claim 1, wherein
the progress management unit receives, from the user, an operation of updating the scheduled time of displaying each of the pages of the conference material, and updates the scheduled time of displaying each of the pages of the conference material.

7. The conference material system according to claim 6, wherein
when the operation to update the scheduled time of displaying each of the pages of the conference material is received from the user after the conference material has started to be displayed, the progress management unit updates the scheduled time of displaying each of the pages of the conference material which has been set before displaying the conference material.

8. An information display device for displaying a conference material including a plurality of pages according to a page operation by a user, the information display device comprising:
a progress management unit configured to compare a scheduled time of displaying the conference material with a time that the conference material is actually displayed for each of the pages, and determine a page display progress of the conference material displayed by the page operation of the user;
a complexity measuring unit configured to measure complexity of the conference material for each of the pages by extracting a text including a character and a diagram from each of the pages and measuring the complexity of each of the pages of the conference material based on a number of characters and a number of diagrams included in each of the pages;
a time amount measuring unit configured to calculate the scheduled time of displaying the conference material for each of the pages, from the complexity of the conference material; and
a display unit configured to display the page display progress of the conference material compared to the scheduled time of each of the pages, based on the page display progress of the conference material determined by the progress management unit,
wherein the display unit is configured to display a progress warning for each of the pages by expressing a scheduled time amount for each of the pages by a first bar graph and an actual time amount for each of the pages by a second bar graph in comparison with the first bar graph,
wherein the first bar graph is divided into first areas each of which is allocated for each of the pages in proportion to the scheduled time amount of each of the pages, and the second bar graph expresses the actual time amount of each of the pages by a second area proportional to the actual time amount for each of the pages in comparison with each of the first areas allocated for each of the pages, and
wherein the display unit displays the progress warning by expressing the second area for each of the pages in a different manner depending on whether the actual time amount for each of the pages delays for more than a first threshold period of time set for each of the pages or the actual time amount for each of the pages advances earlier than the scheduled time amount by more than a second threshold period of time set for each of the pages.

9. A non-transitory computer-readable recording medium storing a program for displaying a conference material including a plurality of pages according to a page operation by a user, wherein the program causes a computer to execute a process comprising:
measuring complexity of the conference material for each of the pages by extracting a text including a character and a diagram from each of the pages and measuring the complexity of each of the pages of the conference material based on a number of characters and a number of diagrams included in each of the pages;
calculating a scheduled time of displaying the conference material for each of the pages, from the complexity of the information;
comparing the scheduled time of displaying the conference material with a time that the conference is actually displayed for each of the pages;
determining a page display progress of the conference material displayed by the page operation of the user, based on a comparison result obtained at the comparing;
displaying the page display progress of the conference material compared to the scheduled time of each of the pages, based on the page display progress of the conference material determined at the determining; and
displaying a progress warning for each of the pages by expressing a scheduled time amount for each of the pages by a first bar graph and an actual time amount for each of the pages by a second bar mph in comparison with the first bar graph,
wherein the first bar graph is divided into first areas each of which is allocated for each of the pages in proportion to the scheduled time amount of each of the pages, and the second bar graph expresses the actual time amount of each of the pages by a second area proportional to the actual time amount for each of the pages in comparison with each of the first areas allocated for each of the pages, and
wherein the progress warning is displayed by expressing the second area for each of the pages in a different manner depending on whether the actual time amount for each of the pages delays for more than a first threshold period of time set for each of the pages or the actual time amount for each of the pages advances earlier than the scheduled time amount by more than a second threshold period of time set for each of the pages.

10. An information display method for displaying a conference material including a plurality of pages according to a page operation by a user, the information display method comprising:
measuring complexity of the conference material for each of the pages by extracting a text including a character and a diagram from each of the pages and measuring the complexity of each of the pages of the conference material based on a number of characters and a number of diagrams included in each of the pages;
calculating a scheduled time of displaying the conference material for each of the pages, from the complexity of the information;
comparing the scheduled time of displaying the conference material with a time that the conference is actually displayed for each of the pages;
determining a page display progress of the conference material displayed by the page operation of the user, based on a comparison result obtained at the comparing;
displaying the page display progress of the conference material compared to the scheduled time of each of the pages, based on the page display progress of the conference material determined at the determining; and displaying a progress warning for each of the pages by expressing a scheduled time amount for each of the pages by a first bar graph and an actual time amount for each of the pages by a second bar graph in comparison with the first bar graph, wherein the first bar graph is divided into first areas each of which is allocated for each of the pages in proportion to the scheduled time amount of each of the pages, and the second bar graph expresses the actual time amount of each of the pages by a second area proportional to the actual time amount for each of the pages in comparison with each of the first areas allocated for each of the pages, and wherein the progress warning is displayed by expressing the second area for each of the pages in a different manner depending on whether the actual time amount for each of the pages delays for more than a first threshold period of time set for each of the pages or the actual time amount for each of the pages advances earlier than the scheduled time amount by more than a second threshold period of time set for each of the pages.

11. The conference material system according to claim 1, wherein the display unit displays the progress warning by expressing the second area for each of the pages in different colors depending on whether the actual time amount for each of the pages delays for more than the first threshold period of time or the actual time amount for each of the pages advances earlier than the scheduled time amount by more than the second threshold period of time.

12. The information display device according to claim 8, wherein the display unit displays the progress warning by expressing the second area for each of the pages in different colors depending on whether the actual time amount for each of the pages delays for more than the first threshold period of time or the actual time amount for each of the pages advances earlier than the scheduled time amount by more than the second threshold period of time.

13. The non-transitory computer-readable recording medium according to claim 9, wherein the progress warning is displayed by expressing the second area for each of the pages in different colors depending on whether the actual time amount for each of the pages delays for more than the first threshold period of time or the actual time amount for each of the pages advances earlier than the scheduled time amount by more than the second threshold period of time.

14. The information display method according to claim 10, wherein the progress warning is displayed by expressing the second area for each of the pages in different colors depending on whether the actual time amount for each of the pages delays for more than the first threshold period of time or the actual time amount for each of the pages advances earlier than the scheduled time amount by more than the second threshold period of time.

* * * * *